US008990196B2

(12) United States Patent  
Gupta

(10) Patent No.: US 8,990,196 B2  
(45) Date of Patent: Mar. 24, 2015

(54) KNOWLEDGE MANAGEMENT SYSTEM WITH COLLECTIVE SEARCH FACILITY

(76) Inventor: Puneet K. Gupta, Newark, CA (US)

( * ) Notice: Subject to any disclaimer, the term of this patent is extended or adjusted under 35 U.S.C. 154(b) by 0 days.

(21) Appl. No.: 12/201,968

(22) Filed: Aug. 29, 2008

(65) Prior Publication Data

US 2009/0083229 A1 Mar. 26, 2009

Related U.S. Application Data

(63) Continuation-in-part of application No. 11/835,658, filed on Aug. 8, 2007.

(60) Provisional application No. 60/969,217, filed on Aug. 31, 2007, provisional application No. 60/981,394, filed on Oct. 19, 2007.

(51) Int. Cl.  
*G06F 17/30* (2006.01)  
*G06Q 10/10* (2012.01)  
*G06Q 10/06* (2012.01)

(52) U.S. Cl.  
CPC .......... *G06Q 10/10* (2013.01); *G06F 17/30038* (2013.01); *G06F 17/30029* (2013.01); *G06Q 10/06* (2013.01); *G06F 17/30867* (2013.01)  
USPC ....................................................... 707/732

(58) Field of Classification Search  
CPC ............... G06F 17/30029; G06F 17/30038; G06F 17/30867; G06Q 10/06  
USPC ............... 707/3, 999.003, 706, 722, 732, 733  
See application file for complete search history.

(56) References Cited

U.S. PATENT DOCUMENTS

| | | | |
|---|---|---|---|
| 2002/0154178 A1* | 10/2002 | Barnett et al. | 345/853 |
| 2004/0128156 A1* | 7/2004 | Beringer et al. | 705/1 |
| 2005/0160167 A1* | 7/2005 | Cheng et al. | 709/224 |
| 2006/0026147 A1* | 2/2006 | Cone et al. | 707/3 |
| 2006/0294085 A1* | 12/2006 | Rose et al. | 707/3 |
| 2007/0067267 A1* | 3/2007 | Ives | 707/3 |
| 2008/0228745 A1* | 9/2008 | Markus et al. | 707/5 |

* cited by examiner

*Primary Examiner* — Jensen Hu  
(74) *Attorney, Agent, or Firm* — Donald R. Boys; Central Coast Patent Agency, Inc.

(57) ABSTRACT

A search facility includes a computerized appliance coupled to one or more private enterprise networks with connected data repositories, the appliance executing software from a machine-readable media, and a portal from one of the one or more private enterprise networks to one or more networks external to the enterprise. The software provides an interactive interface on a display of the appliance, the interface providing an input mechanism for a user to enter search criteria and an initiation mechanism for the user to initiate a search using the entered criteria, and wherein a search thus initiated searches both the data repositories within the enterprise, and sources outside the enterprise accessible by the one or more networks external to the enterprise.

3 Claims, 22 Drawing Sheets

| create new ▶ | Opportunity-Name products[0] open activities[0] |
| --- | --- |
| Recent Items | activity history[0] notes/attachements[0] contact roles[0] |
| Tibco | partners[0] competitors[0] stage history[0] |
| Tao Chen | details |
| TBE | opportunity owner    John Smith    amount |
| HPS | opportunity name    Tibco    close date |
| HP | type    new customer    stage |
| SAP | lead source    phone inquiry    probability |
| Move.com | created by    John Smith    last modified by |
| Motorola | tracking number    br61457g |
| Connectbeam | custom links    delivery status |
| Citigroup | |
| | edit  delete  clone |
| Recycle Bin | The following users and search tags a were found based on the details of this opportunity | information bus Tibco vivek middleware vitria

| Name | Title | Email | Related Tags |
| --- | --- | --- | --- |
| Mike D | sr. proj. mgr. | miked@cb.com | information bus, vivek |
| John H | RVP sales | johnh@cb.com | tibco, middleware |
| Paul G | RVP sales | paulg@cb.com | tibco, vitria |
| Debra L | Dir. HR | debral@cb.com | vivek |

1603

Google

Web Images Video News Maps more »

[Aviation Lighting] [Search]  Advanced Search
                                Preferences

Related Tags aviation, aviation ground lighting, airplane lighting, aviation lighting, boing 777, civil aircraft, heliport lighting, HD lighting, IES, LED, navel handling, navigational lights, orga, reading lights, solar powered, system controls, warning lights

Related Users  Sponsered By Connectbeam

Jack Angus, Sam Daviddovits, Mary Haggar, Mary Jankovits, Sue Klein, Jim Norling, Rich, Rogers, Tim Rodes, Julie Sinolair, Sue Sanders, Rajeev Singh, Bob Soars, Andre Stotzer, Dan Thomas    more...

Portable Airfield Lighting from Metalite Aviation Lighting
Portable airfield Lighting Systems suitble for Civil or Military applications and able to comply with annex 14, CXAP 68 and FAA plus STANGs 3534 and 7025
www.metaliteaviation.com/ - 9k Cached - Similar pages

Metalite Aviation Lighting
Portable airfield, helipad and runway lighting designed specifically to meet ICAO, CAA, FAA and NATO standards The range includes protable runeay nad ...
www.metalite-aviation.com/ - 4k - cached - Similar pages

Light and Flight Aviation and Lighting Supply
Light and Flight is an aviation supply store by aviators. We have a knowlegeable and friendly staff, a wide range of products....
www.lightandflight.com/ - 9k - cached - Similar pages

Sponsered Links

Free Air Safety Courses
free online courses in GPS
VFR, IFR and more. See course list
www.AOPA.org/ASF

Buy Obstruction Lighting
Obstruction lighting Strobes
High, Medium, Low intensity Strobes
www.GenesisLamp.com

*Fig. 20*

KNOWLEDGE MANAGEMENT SYSTEM WITH COLLECTIVE SEARCH FACILITY

CROSS-REFERENCE TO RELATED APPLICATIONS

The present invention claims priority to and is a Continuation-in-Part of U.S. non-provisional patent application Ser. No. 11/835,658 filed Aug. 8, 2007 for common disclosure, to provisional patent application 60/969,217 filed Aug. 31, 2007, and to provisional patent application 60/981,394 filed Oct. 19, 2007. Disclosure of all of the parent cases is incorporated herein at least by reference.

BACKGROUND OF THE INVENTION

1. Field of the Invention

The present invention is in the field of enterprise external and internal network communications and pertains particularly to tools and software for enabling categorization and management of human and workflow resources, as well as search systems.

2. Discussion of the State of the Art

With the advent of networking, companies and organizations have depended on software-based communications and research tools to manage enterprise activities and to attempt to improve workforce performance; streamline workflow; and improve quality of service. Many modern network-supported communication and collaboration tools include Email Applications, Instant Messaging Applications, File Sharing Applications, Network Collaboration Software, Time Management Applications, Central Directory Applications, Network Telephony Applications and a wide array of others. Many of these tools are often packaged together as Customer Relations Management (CRM), Internal Relations Management (IRM), and Business-to-Business (B2B) Enterprise Solutions. These solutions are meant to improve performance of the enterprise as a whole.

In an enterprise, it is critical that internal data required to enable task performance is easy to find, and once found, immediately accessible to those who need it. Several challenges exist for a large enterprise related to human task performance, internal interaction and data retention, and database management as it relates to workflow within the enterprise. In many large enterprises, a class of workers known as knowledge workers is typically responsible for much of the data management and how that data may be accessed and used, as well as how data is stored and maintained within the enterprise data stores. It is important that critical data has integrity, is reliable, and can be swiftly accessed and improved upon by updating and adding new relevant data.

In many enterprises workers who must generate workflow spend inordinate amounts of time trying to locate relevant information within the enterprise that may be critical to their tasks. In many cases they must order data from an authorized knowledge worker and must wait until the knowledge worker can accommodate the request. More particularly, there is typically no smooth, incoming flow of task relevant data to the worker. If the worker has an internal search tool, often much irrelevant data is included in a search result with a small portion of relevant information that the worker must drill down to.

Another problem that exists with larger enterprises is that knowledge of human resources, employee skills, ongoing projects, product data, service data, customer data, and so on is not typically available across the divisions of the enterprise compartments. For example, a worker in sales management may not be familiar with the personnel and expertise of those personnel working in the manufacturing arm of the same enterprise. Much input may be required of the worker to search out and disseminate this type of data if authorized to receive it.

There are existing applications that attempt to centrally locate employee information, database resources, and other such information so that an employee, by logging into a system using a desktop application may access information and other resources during the performance of workflow. A problem with this approach is that it is standardized in format, rigid in protocol, and often-complex procedures (almost rituals) are required to actually gain access to relevant information. Often the data, once accessed, is old and out of date, no longer relevant, or otherwise not validated as useful or the right data to incorporate into the workflow. Data aggregation and updating of the system databases with relevant data does not occur while the workflow progresses but often at some later time, meaning that the most recent data is not always available.

Often as well relevant data needs to be associated with, or provided in a way to complement other relevant data. Sometimes more abstract data is required in order to enable the worker to understand the data he or she has accessed. A supervisor or a more knowledgeable worker may not be immediately available to the worker to help tie the meaning of the data sets together. Enterprise personnel are constantly struggling with these types of frustrations under existing information-access and data management systems.

In the art at the time of the present application a search utility or tool accepts search criteria, and searches a known and limited body of data. For example, Google, and most other commercially-available search applications search the Internet network, returning URLs that are the addresses of websites where the search criteria is found. Similarly, enterprises, that is, a company that may have an internal intranet, may have a search capability for searching data repositories within the enterprise. This may be functional even if the enterprise may have multiple sites, some of which may be in different counties and on different continents.

There is, within an enterprise environment, a considerable motivation to keep sensitive information inside the enterprise, and it is typically not available that a person or agent outside the enterprise may be able to search information inside the enterprise. Still, it is highly desirable that a worker associated with an enterprise be able to quickly and efficiently collect as much information (intelligence) as possible when acting and deciding issues on behalf of the enterprise.

What is clearly needed, therefore, are systems and methods that make it possible for a worker in an enterprise to search not only data stored or otherwise accessible inside the protective cocoon of the enterprise, but in the same act, that is, by the same click in a search function, to search data repositories outside the enterprise, and to preferably keep the returns associated with inside/outside source.

SUMMARY OF THE INVENTION

The inventor in this application has determined that in many situations a person who wants or needs to search for information according to certain criteria is limited to performing separate and reconfigured searches if that person wishes to search the broadest range of potential sources of information. Some sources may, for example, be domiciled behind a firewall in a private enterprise, some on sites coupled to public networks, and some within such public sites, but at some lower or internal information layer, such that a commercial search would not find the information. The inventor therefore determined that a search facility and functionality is necessary that will allow the person to search all available potential digital sources in a single configuration; that is, a single entry of search criteria and a single launching of the search.

Accordingly the inventor has provided a search facility comprising a computerized appliance coupled to one or more private enterprise networks with connected data repositories, the appliance executing software from a machine-readable media, and a portal from one of the one or more private enterprise networks to one or more networks external to the enterprise. The software provides an interactive interface on a display of the appliance, the interface providing an input mechanism for a user to enter search criteria and an initiation mechanism for the user to initiate a search using the entered criteria, and wherein a search thus initiated searches both the data repositories within the enterprise, and sources outside the enterprise accessible by the one or more networks external to the enterprise.

In another aspect the inventor has provided a method for search comprising the steps of (a) entering criteria in a search window of an interactive interface on a display of a computerized appliance coupled to one or more private enterprise networks with connected data repositories, the private network including at least a portal to one or more networks external to the enterprise, the appliance executing software from a machine-readable media, (b) initiating a search by a mechanism in the interactive window, and (c) performing a search directed by the software both within the data repositories within enterprise and sources coupled to the one or networks external to the enterprise.

BRIEF DESCRIPTION OF THE DRAWING FIGURES

FIG. 16 illustrates workflow when Connectbeam is integrated with Salesforce™

FIG. 20 illustrates an interactive window of a sort a browsing person might see when accessing Google™.

DETAILED DESCRIPTION

In one embodiment of the instant invention he inventor provides a network-based software/hardware system that allows workers and associates of enterprises to discover information and collaborate with each other and to share resources in new and novel ways. The system in a preferred embodiment dynamically manages all enterprise contacts and data produced by those contacts in a way that enables any-point aggregation of knowledge and resources distributed among those collaborators. The methods and apparatus of the invention are described in detail below.

Figure 1:
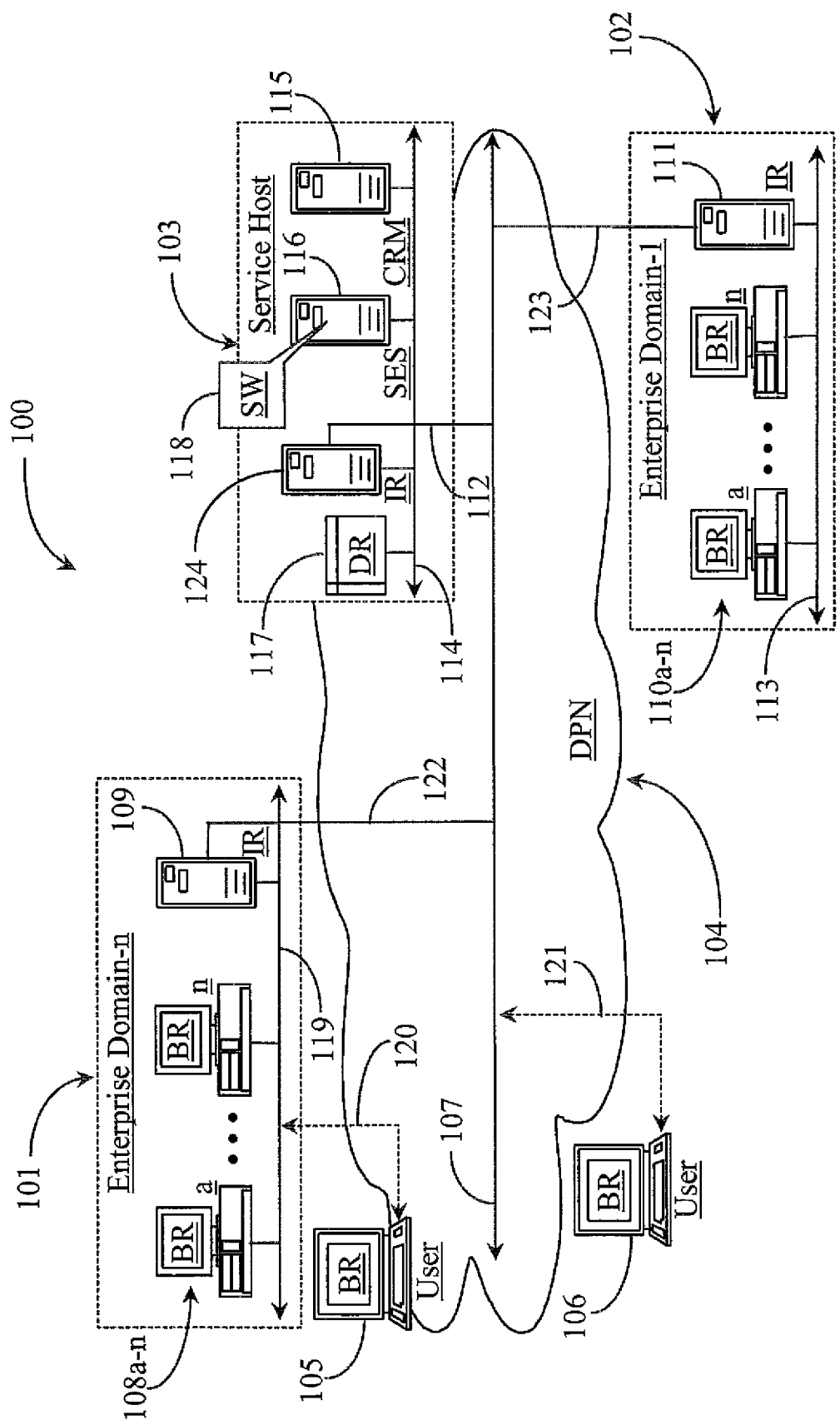
FIG. 1 is an architectural overview of a communications data network supporting enterprise-centric collaboration and knowledge discovery and management according to an embodiment of the present invention.

FIG. 1 is an architectural overview of a communications data network 100 supporting enterprise-centric collaboration and knowledge management according to an embodiment of the present invention. Communications data network 100 is a super set of network segments that are coupled together. Network 100 includes a wide area network (WAN) 104. WAN 104 may be the Internet network or a corporate Intranet connected to the Internet, typically behind a firewall without departing from the spirit and scope of the present invention. WAN 104 supports all Internet transport protocols, including supported data formats for electronic information pages known as Web pages in the art.

WAN 104 is further defined by a network backbone 107 extending there through that represents all of the lines, equipment, and access points that make up the network as a whole. Therefore, there are no geographic limits to the practice of the present invention. Network 100 includes an enterprise domain-1 (102) and an enterprise domain-n (101) hereinafter referred to as enterprise domain 101 and enterprise domain 102. Domains 101 and 102 may represent any enterprise or company to which the service of the present invention may be provided generally through a company subscription or subscription to services by individuals employed by those enterprises.

Enterprise domain 101 includes a local area network LAN 119 that is adapted for WAN access and may be considered a segment of WAN 107. WAN connectivity from LAN 119 is accomplished through an Internet router 109 that is connected both to LAN 119 and to backbone 107 via a WAN access line 122. LAN 119 further includes a plurality of LAN-connected employee stations 108 a-n. Access to the service of the present invention is, in one embodiment, browser based. Each station 108 a-n has a browser (BR) installed for network navigating as is generally known in the art. Enterprise 102 has a LAN 113 supporting employee stations 110a-n and an Internet router 111. Router 111 has connection to backbone 107 via a WAN access line 123. In one embodiment LAN 119 may be a corporate WAN or Intranet connected to Internet or WAN 104 behind an enterprise firewall. LAN 113 may also be a corporate Intranet or similar network.

A service host domain 103 is illustrated in this example. Service host 103 provides services to enterprise domains 101 and 102. Host 103 has a LAN 114 adapted, in this case, as a segment of WAN 107. LAN 114 has connection to backbone 107 via an Internet router (IR) 124 and a WAN access line 112. The exact method of WAN access may very between enterprises and a service host. In a preferred embodiment high-speed WAN access is provided with sufficient bandwidth capabilities for efficient practice of the present invention.

LAN 114 supports a customer relations management (CRM) server 115. Server 115 may be used to manage client subscription activity, registration activity, and billing activity. LAN 114 supports a session server 116 running a software application 118. Server 116, enabled by software 118 provides functionality in this embodiment of the present invention. LAN 114 supports a data repository 117 for storing data arising from client activity with the service including storing profile information for individuals and companies they work for or with.

In this example, there are two remote users. These are a user 105 and a user 106. User 105 is represented as a laptop station connected by a wireless link to LAN 119 within domain 101. It is to be understood that client and user refer to the person who may be using an appliance for access to the systems of the invention, but in the drawings and description, for convenience sake, the enabling appliance, such as the laptop computer shown at 105 in FIG. 1, may be referred to as client or user.

In this example, user 105 has access to WAN backbone 107 through a shared network connection enabled by router 109. The enabling appliance may be a laptop computer, a personal digital assistant (PDA) or some other hand-held computing device capable of navigating a WAN. Access from remote user 105 to the service of the invention is accomplished by establishing a wireless link 120 to LAN 119. Once LAN connected, user 105 may use IR 109 and WAN access line 122 to access services.

User 106 is enabled also by a laptop. However, many other configurations are practical, such as a PDA or another type of Internet capable appliance. Unlike user 105, user 106 has a direct WAN-access connection to backbone 107 within WAN 104. In this case, a user operating station 106 is independently remote and is not constrained by any specific network boundary in order to access services. User 105 may be employed by or may be a colleague of enterprise 101 while user 106 may be an employee of or colleague of enterprise 102. There are many variant scenarios possible. The inventor simply intends to show that a user is not required to operate within an enterprise domain or to be LAN connected in order to practice the present invention. In one embodiment any user operating a WAN-capable appliance may access the service of the present invention.

Service host 103 provides a secure portion of memory space in data repository 117 for each subscribing enterprise and for each subscribing user. Each enterprise is given a unique domain for data management purposes. Each individual associated with a service-registered enterprise typically has an email address assigned by the enterprise, such as jaybird@companyname.com. Therefore, each individual user signing up under the domain name of a company has personal memory space allotted from the whole of the memory space dedicated to the enterprise associated with the user. In another embodiment, an enterprise may subscribe on behalf of all employees. In this case, individual registration may not be required. The enterprise may by default include all employees or just those of a certain group or groups within the enterprise.

The organization of individuals by email identification enables the service to associate all of the work and data of individuals of an enterprise under the given domain of the enterprise as recognized by the service. For example, crisco.com may have many employees registered to use the service of the invention; however all of those have a Crisco email address and use that address and their own contact names or handles as their personal identifications. In one embodiment users who do not have email addresses that include the enterprise domain may still be grouped temporarily under an enterprise domain if that user is a subscriber and is invited into an enterprise domain of the service by someone within the domain.

SW 118 may include all of the capabilities for interfacing to multiple users belonging to multiple subscriber enterprises and remote users. SW 118 may contain all of the implements for enabling collaboration, including file and data sharing in a secure manner. SW 118 also includes backend data management capabilities such as individual and collective interaction history management, user data profile management, and collective knowledge aggregation and management both in enterprise specific domains among users and in some cases between collaborating enterprises correlating data across enterprise boundaries defined within the service.

One purpose of session server 116 is to collect accurate time based interaction histories of subscriber work activity within the subscriber enterprise. One aspect of this activity is to allow users to save electronic references or bookmarks that point to electronic information pages and documents that may be found externally on the wider network and/or in any designated server storage or personal device storage device that may be made accessible to the service over a network. SW 118 facilitates the creation of high-level profiles of content saved as bookmarks that include a representative snapshot of the information page or document. A Create Page feature within the bookmark process is provided to enable creation of one or more summary pages describing the content for which a link was created by bookmarking. The profile may include a summarization of the subject matter contained in one or more pages of an electronic resource such as a Web site. Similarly, an electronic document may be rendered by the service to provide a long description of the content of the document.

Still another aspect of this unique bookmarking capability of SW 118 is an ability of the software to aggregate key descriptive words found in the electronic information pages or documents and to suggest those keywords as possible search terms that may be used to find the resource on the network from within the service domain. Users may tag content with one or more labels suggested to them when they bookmark a resource and the user may additionally add his or her own tags or may select other terms found in the resource that were not suggested by the system such as sir names of service personnel or the like.

For purposes of discussion a folksonomy may be thought of as an open-ended labeling system that is generated and grows through collaborative tagging or content labeling. Users may tag online content, photographs, documents and files, web links, etc using freely chosen labels (tags) to help in later searching for the tagged content. The content is categorized using a familiar, accessible, and shared vocabulary. Folksonomies are a phenomena of social interactive networks typically enabled through the Internet. Users may generally discover who created a tag for specific content and may see other tags created by the same user. The benefit is that ultimately related content is much easier to locate on the network. In this way, folksonomy users often discover the tag sets of another user who tends to interpret and tag content in a way that makes sense to them. The result may be an immediate and rewarding gain in a user's capacity to find related content.

SW 118 enables enterprise personnel and other authorized subscribers to practice folksonomy-based tagging of content in order to categorize that content for more efficient location of the content. In practice of the present invention, enterprise 101 and 102 have their own secure company domains set up at the service. Therefore all content created by persons of an enterprise falls under the company wide domain unless that content is personal content. Users may elect which content they will allow others from the same enterprise to access. The system of the invention tracks all activity by subscribing enterprise personnel and keeps record of the activity, some of which becomes part of that person's "universal" profile that may be visible to other subscribers authorized for the same enterprise domain. Users belonging to enterprise 102 may not see or have access to any information or data belonging to enterprise 101. However in one embodiment where authorized by cooperating or collaborating enterprises, some users may see and have access to information of other users not in their immediate enterprise. The same host in this fashion services multiple enterprises. However, this is not required in order to practice the invention in one embodiment as the service may be set up as a turnkey system for use by a single enterprise within that enterprise.

User 105 and user 106 may belong to one or more enterprises if so authorized. For example, user 105 may be a subscribing consultant or contract worker that may have limited access to data from enterprise 101 in so much as what may be deemed required in order for that user to fulfill his contract with enterprise 101. Likewise, the same user 105 may be a subscriber through enterprise 102 as well if enterprise 102 is a client of user 105. In this case, the user may have more than one account and authorization code or password. Any activity the consultant 105 engages in while logged in through a specific enterprise is recorded into the enterprise domain and may only be visible to other personnel of enterprise 101. When consultant 105 is working for enterprise 102, he would be required to login using the authorization for that enterprise. Security measures may be enforced to ensure that someone working for an organization temporarily cannot move data across multiple profiles or (enterprise domains).

In another embodiment of the present invention, certain groups of different enterprises may elect to share data and personnel profile information among authorized users. In this case, a correlation between domains may be temporarily set up for those authorized collaborating subscribers such that a primary domain and, perhaps sub-domains exist for one user. In this way all activity created will be recorded into the primary domain space of a user while the user may still have access to data and personnel from another enterprise using a sub domain account. All activity created while operating in the sub-domain space is recorded into the domain space of the other enterprise. In still another embodiment, a more permanent combo domain may be created where more than one enterprise may share a single domain space and group of subscribers.

The inventor combines social interaction capabilities with business collaboration tools and communication tools in a manner such that they are all easily accessible from a single user interface, which in one embodiment, is a third-party hosted interface accessed through a typical browser application. Once a user logs in to server 116, his enterprise domain space is accessible and the universal profiles of other personnel using that domain space are accessible. More detail about the user interfacing capabilities of SW 118 is provided below.

Figure 2:
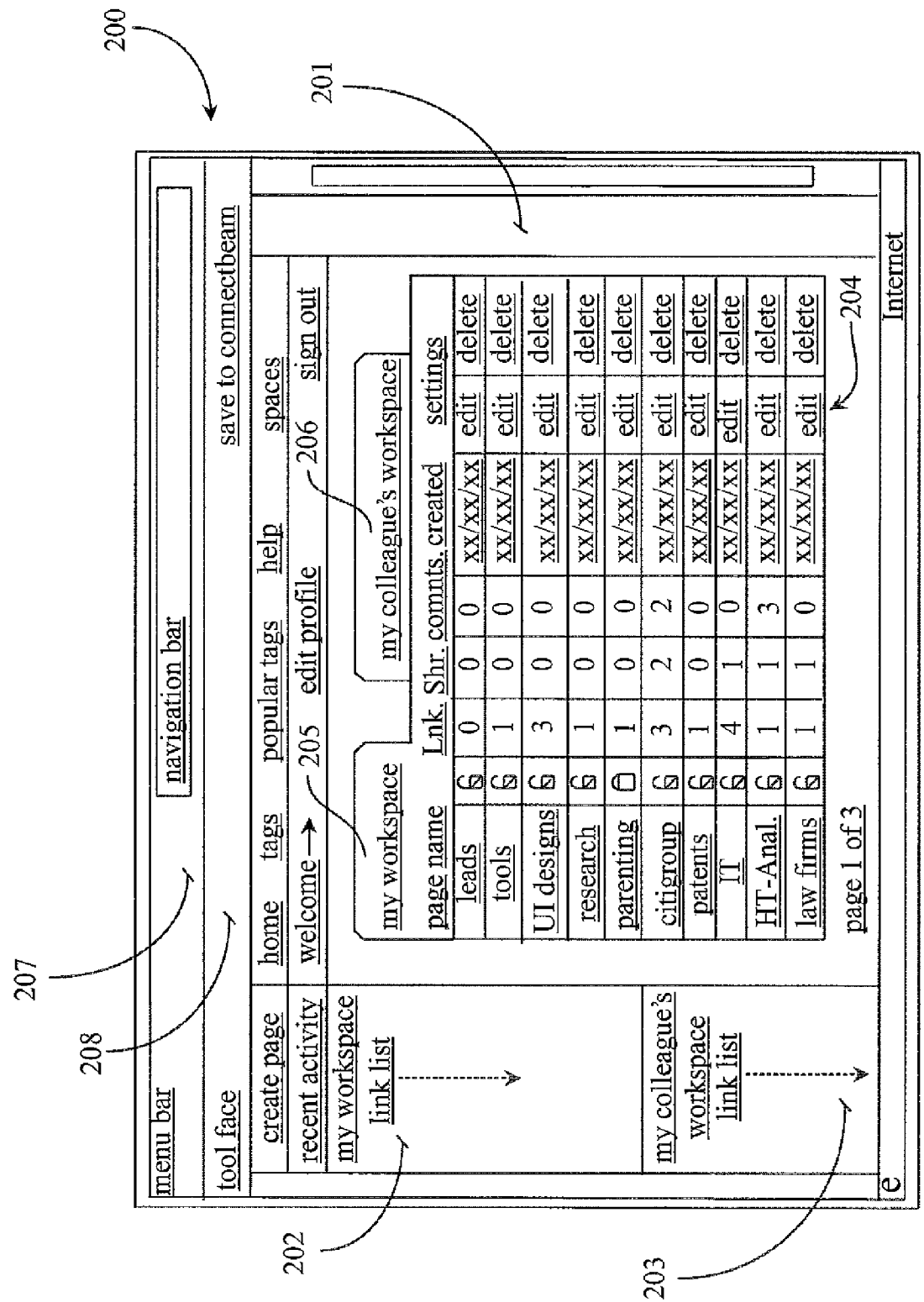
FIG. 2 is a screen shot 200 illustrating a user workspace dashboard according to an embodiment of the present invention.

FIG. 2 illustrates a screenshot 200 showing a user workspace dashboard according to an embodiment of the present invention. Screenshot 200 is a browser-based screen interface resulting from a successful login to the service of the present invention. As such, typical browser functions, icons and features known to exist in browser applications may be present in this screen shot. Standard browser menu options 207 are present including a universal resource location (URL) navigation field. Tool face 208 contains both standard interactive icons provided with the interface and standard interactive icons added by a user such as links to other services and the like.

Screenshot 200 includes a workspace window 201. Window 201 is vertically scrollable in this example. Within window 201, a populated information table 204 is automatically presented by default. Table 204 contains two optional views in this example. One of these views is labeled my workspace selectable by way of interactive tab. The other optional view is labeled my colleagues workspace. In this example, table 204 spans 3 HTML pages. The current page being viewed is page 1 of 3.

Table 204 has a number of information columns, each providing a field for some bit of information attribute. Table 204 also has horizontal rows, each row dedicated to a created "page" the user has "bookmarked" into the service. The first column reading from left to right is labeled page name or an equivalent. The page name is generally the title that a user applies to the resource bookmarked. Each title is a hyperlink to the start page of the particular resource bookmarked. A resource may comprise just one page or many pages. A next column indicated with a "lock" icon tells whether the user has elected to share a page company wide or to keep the page private so only the user may access the page. A clean lock (closed) indicates that the page is private such as is the page "parenting" further down the column. A lock with a red or other color diagonal line over it in the unlocked position indicates a shared page. In one embodiment, the user may further indicate which company personnel or outside users may have access to the page. It is not specifically required that sharing a page be company wide or to "all persons" subscribing to the service of the invention through the enterprise. However, the purpose of a shared resource that is company wide is clear and that is to contribute to the pool of resources available to the employees of that enterprise.

The next column to the right is labeled links saved (Lnk.) or an equivalent and indicates for each created page, the number of links the user has saved to that page. A next column to the right indicates the number of persons that the user has shared the page with labeled (Shr.). The user may share a page with all enterprise personnel "company wide" or with selected personnel. The next column labeled comments or an equivalent (comnts.) indicates the number of comments other users have submitted to each page. The next column to the right indicates what date the associated page or bookmarklet was created. The next two columns to the right are grouped under the label "settings". The first of those columns contains an interactive option for editing the page. The second of those columns contains an interactive option to delete the page from table 204 and from that user's workspace.

The interactive tab 206 labeled my colleagues workspace may be selected to view a colleague's summary table with all of the information organized similarly or identical to table 204. A user may select which colleague or colleagues he or she wishes to view the associated information in table 204. In one embodiment if all of a user's colleagues are presented to the user in a list, then each list entry may be a link to that particular colleague's workspace.

Screen 200 has a sidebar area 202 that also lists the pages created by the user in the user workspace or "My Workspace". A sidebar area 203 contains a list of colleague pages displayed by default. A user may change the way the sidebar area lists pages. In one embodiment, when a user clicks on "My Workspace" the list appears in text format each text entry hyper linked to bring up the page. In another embodiment icons may be displayed instead of text hyperlinks. Another option in the general sidebar area of screen 200 is labeled "Recent Activity". Clicking on this option may cause a summary display within workspace window 201 that provides some detail of the most recent activity listing the pages that are associated with that activity. Yet another option in the general sidebar enables a user to create (bookmark) a new page.

Still more options are available within screenshot 200. An option is available for editing the profile of the user. An interactive option labeled "My Tags" or equivalent (tags) located in a toolbar area above the sidebar allows the user to view all of the tags he or she has created to categorize content. An adjacent option to the right of the "my tags" option enables the user to view "popular tags" created and used by all of the enterprise subscribers of a same enterprise. Likewise, when a user is viewing a colleague's workspace, he or she may see all of that user's tags and the tags that colleague has used to categorize his or her pages or resources bookmarked.

Some interactive icons are available in toolbar area 208 that may not be available in a typical browser links area. One example is an interactive icon that enables content viewed within window 200 to be saved into the service of the invention. The service is termed Connectbeam by the inventor hence the icon labeled "Save to Connectbeam". There is another iconic link to "spaces" that may enable the user to view different colleague workspaces that the user has configured to view and is authorized to view. The dashboard like functionality of the interface of this example allows users the flexibility of quickly navigating to projects and workflows that are most important to the user. The user is not required to manually sort and organize any content. The service does all of the data management for the user based on the user's preferences and tag words created for categorization purposes. The service automatically updates data content as it is being modified. This function can be achieved in the background or with user prompts and responses.

It is noted herein that the user who is operating screen 200 may also configure a variety of communications applications for adaptation to the service of the present invention. For example, Instant Message (IM) communication strings may be recorded between the user and one or more designated colleagues. Any such communication records may automatically be incorporated as "page related activity" and may be stored under the appropriate link for the affected resource. If john @ XYZ company is collaborating with Joe @ XYZ company using IM, the messages sent may be recorded and later discovered by submitting a tag keyword into a search engine from the project. The system will return the pointer to the IM transaction sequence or log as part of the links under the created page.

Figure 3:
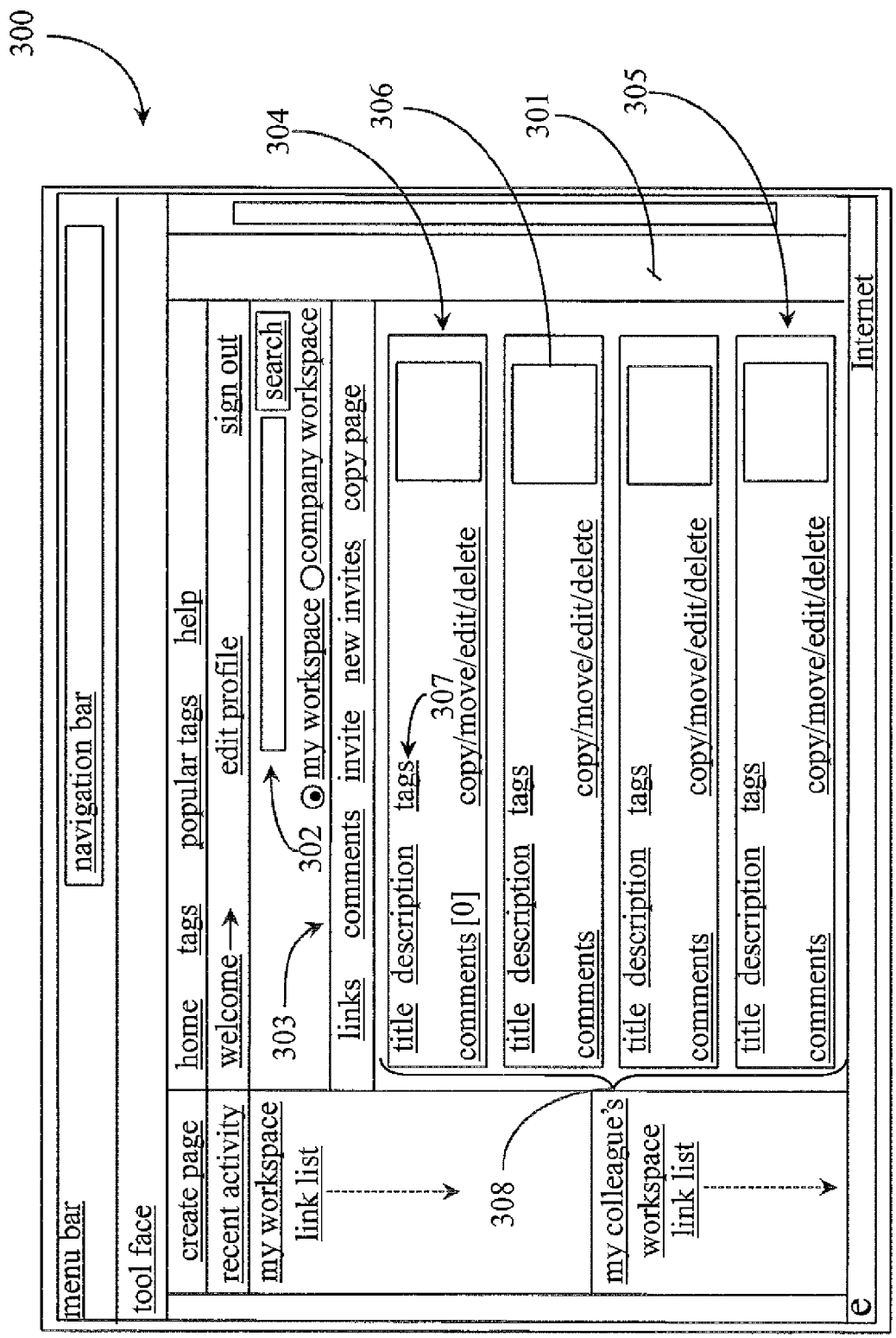
FIG. 3 is a screen shot 300 illustrating a user page link view interface according to an embodiment of the present invention.

FIG. 3 is a screen shot 300 illustrating a user page link view interface according to an embodiment of the present invention. Screenshot 300 my result by double clicking any created page link in a workspace. Such interaction causes display of a list of hyper links attached to the category. Screenshot 300 has a workspace window 301 that is scrollable and that displays a summarized list 308 of the individual bookmarks that have been added to the category page. A data search field 302 is provided above workspace window 301 for searching a workspace. Options associated with the search field enable a user to search "my workspace" or a "company workspace". In this case, "my workspace" may contain private pages and links not shared with others and "company workspace" may contain company wide pages and links. In one embodiment an option for searching a colleague workspace may also be provided by including a field for typing in the email identification of the colleague.

Individual bookmarks or summarized links may be listed in the order they were added or they may be prioritized according to activity, registered comments, or any other scheme. A link 304 and a link 305 represent individual link entries in the aggregate of links added to a page. Referring now to link entry 304, the link has a title section identifying, in this case the source, date and title of a published news article. The brief summary or description indicates or may indicate who added the link to the page and when the link was added to the page. The page may have a title such as Web 2.0 for the enterprise in this example. A tag or tags (307) may be used to categorize the page. For example, the tag Web 2.0 may be used to categorize a page or page link related to a We 2.0 resource bookmarked as a created page or book marklet as termed by the inventor. There is an indication of the number of comments that have been added to the link. In this example there are no comments. There may be many more than one comment, perhaps hundreds of comments. If there were a comment or comments indicated, the user could navigate to the comments by clicking on the indication parameter.

In one embodiment, users may create tags to their comments so that in the case of many comments, a user may search out comments of a particular flavor by submitting a tag as a keyword to locate the comment from many in the list. For example, if there are positive and negative comments, the user may wish to view only the more positive comments. There are also interactive options provided within the link entry 304 for copying, moving, editing, or deleting the link entry.

Each link entry such as entry 304 includes a thumbnail view of the start page or face page of the linked resource. The face page may not actually be the start page of the linked resource. The user may select any page of the linked resource for the thumbnail view. In one embodiment the thumbnail view is expandable for better viewing. In one embodiment, a tool may be provided for the user to select portions of content from more than one page of the linked resource and then make that page a thumbnail view on the page link.

In one embodiment a more detailed description may be required for example to categorize content that is donated by users such as their own opinion papers and research papers or notes prepared that are related to "Web 2.0 for the enterprise for example. In some embodiments where the links are Web pages, the description may be automatically parsed from unstructured HTML of the donated page or other markup languages that may have been used to display the resource. Each link may already display one or more suggested tags. However a user may add tags if desired. As tags are added and become popularized through sharing, the suggested tags become more and more effective when used in a search engine to locate those resources.

A links bar may provide at the bottom of screen 301 for displaying default or added general links. In this example there are no displayed links. In one embodiment there may be 1-3 or more displayed hyperlinks listed such as one to open a blogging application, one to access "InfoWorld", and one to access current news for example.

Each of the link entries such as entries 304 and 305, for example, may be automatically created and added to the list each time a user decides to bookmark a resource. The software of the invention is able to create a summary link entry profile from unstructured HTML or other markup language used to originally create the page. Likewise, documents containing graphics may be summarized in the same way by first converting them to Web-based markup like HTML and then summarizing them. The actual resources are not specifically uploaded to the service site unless a user initiates such activity. In many cases, the link entries are pointers to the actual resource maintained on a remote network server.

Figure 4:
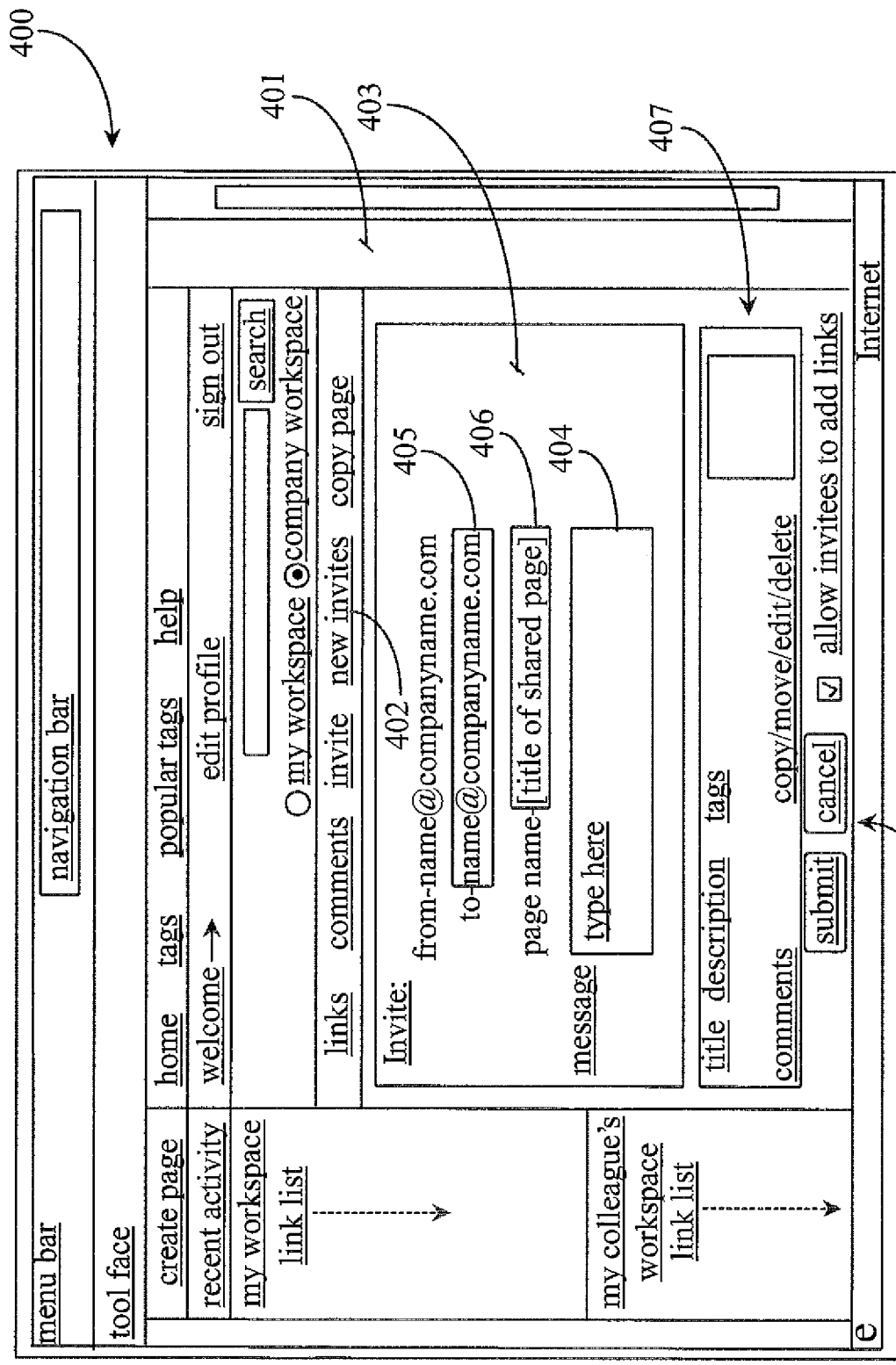
FIG. 4 is a screen shot 400 illustrating a content sharing interface according to an embodiment of the present invention.

FIG. 4 is a screen shot 400 illustrating a content sharing interface according to an embodiment of the present invention. Screenshot 400 includes a workspace window 401 that is scrollable. A bookmark-sharing interface 408 is displayed within window 401. Interface 408 enables a user to submit individual bookmark summaries to any colleague. The person accepting the links may save the modular link entries or bookmarks into any of the category pages that may exist in his or her workspace. Interface 408 may result from the user clicking on a new invite icon 402. The user may pre-select the link entries before invoking interface 408 or the user may invoke interface 408 and then drag and drop, or cut and paste any entries into the field provided in the interface. In this example, entries 407 are displayed for submission. Entries 407 together may be considered a page that is shared. An option for allowing invites to add additional links to the page is provided on the interface.

Interface 408 as an address pane 403 for setting up the invitation to share the page. Address pane 403 includes a text entry field 405 for inputting the email handles of each invitee that will receive the page. A carbon copy (CC) field and a blind carbon copy (BCC) field may also be provided similar to an email interface. Address pane 403 also includes a subject field 406 for inputting the name of the page that is designated for sharing. In one embodiment, an entire page with all of the link entries may be submitted. In another embodiment, only specified links from the page may be shared. Address pane 403 includes a message dialog box 404 for typing in a message to an invitee or invitees that may ultimately accept or ignore the invitation. By sharing category pages and enabling other users to review and add more links to the page, more knowledge associated with the subject becomes available to all of the collaborators. Eventually the page may make its way back to the original sender with many more bookmarks than were originally included into the page. Therefore a task such as buying computer equipment, for example, might be shared with a group whereby each individual in the group may provide some form of information that is related to the task at hand. This may provide the buyer with added information that was previously unavailable to the buyer or that was simply unknown to the buyer. The actual purchase made may be more beneficial to the enterprise because of the instant collaboration that took place before a decision was made to purchase.

Figure 5:
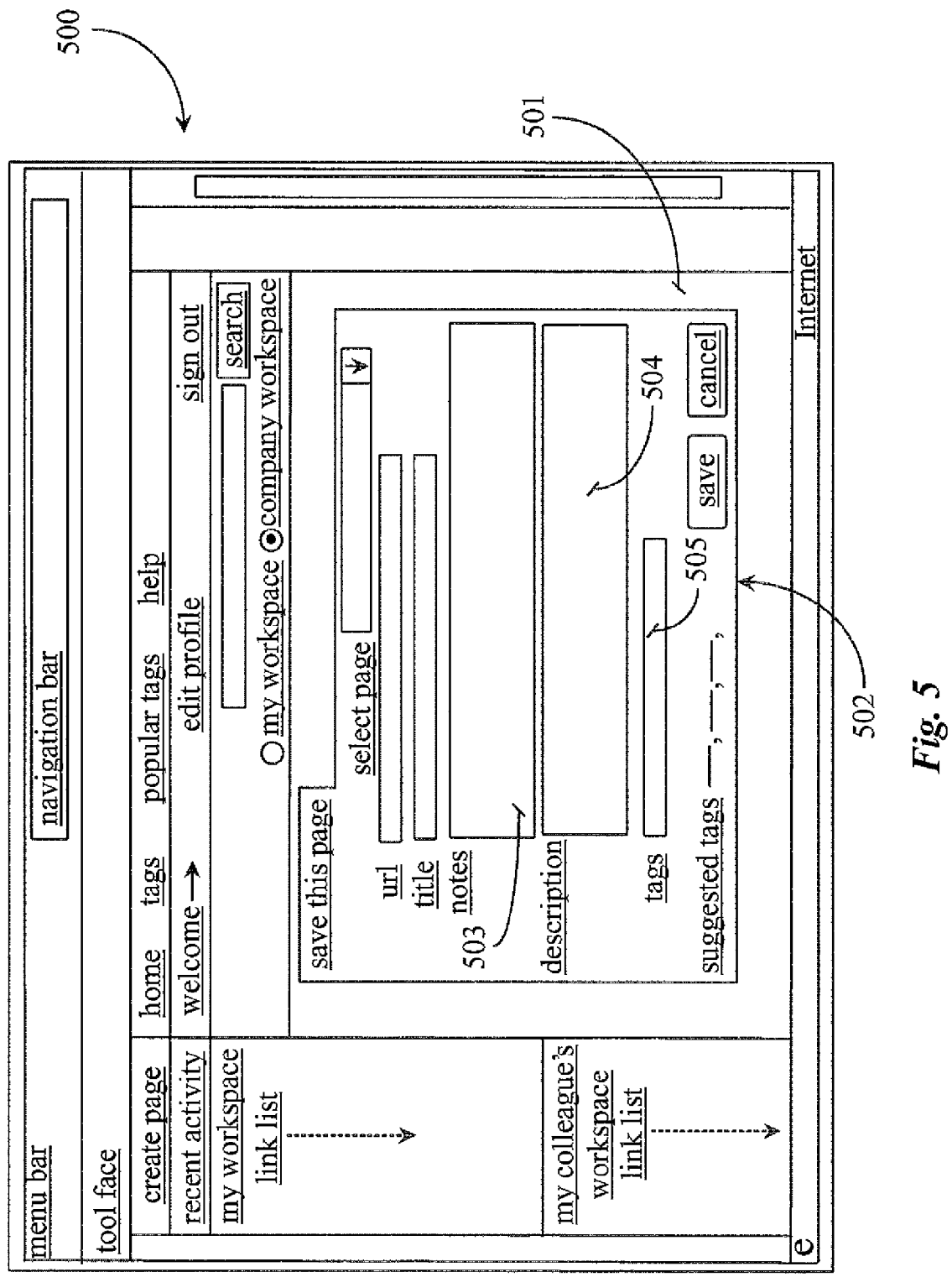
FIG. 5 is a screen shot illustrating a bookmaking interface according to an embodiment of the present invention

FIG. 5 is a screen shot 500 illustrating a bookmaking interface according to an embodiment of the present invention. Screenshot 500 contains a workspace window 501 that is scrollable. Window 501 contains a bookmark interface 502 that enables a user to save a resource as a new link entry to add to any page in the user workspace or to that of a colleague (if allowed). In one embodiment, a saved resource may be created as a new page in the user or company workspace that may accept additional links added by the user or colleagues of the user. In this case, interface 502 may be used to save multiple URL addressed resources. It is important to note herein that other addressing methods different than URL addressing may be applicable in practice of the present invention. The actual addressing scheme may depend on the network implementation. In one embodiment, more than one addressing scheme may be used for book marking disparate resource types supported by different storage and display formats.

Interface 502 has a drop down menu selection field for designating, in this case, which category page that the immediate resource will be saved to. In this case, the bookmark is added as a summary link entry as previously described. Also in this case the resource happens to be a Web page, although it is not specifically required in order to practice the present invention. Interface 502 includes a text entry field for imputing, in this example, the URL of the Web page that will be saved. In one embodiment, a URL may be created in the case that a resource is an electronic document that is to be converted into an HTML or HTM version. A text entry field for entering the title of the resource is provided immediately below the URL field in this example. The title field may be automatically populated. In one embodiment, a user may change the title or edit the title before saving the resource to the service.

Interface 502 includes a dialog box 503 for imputing notes about the resource. Dialog box 503 may be manually populated by the user if notes are to be added. In one embodiment, there may be some parsed information from the resource automatically input into dialog box 503 by the software of the invention and the user may elect to add or edit the automated text, or to accept what the system has provided.

Interface 502 includes a dialog or description box 504 adapted to contain a summary description of the resource. In one embodiment the software automatically populates the descriptive portion based on parsed information from the resource. In one embodiment, a user may add, modify, or delete and replace the description portion of the resource. A snapshot or thumbnail of the first HTML page of the resource may be provided just to the right of dialog boxes 503 and 504 or somewhere else in interface 502 (not illustrated in this view). A user may accept the system snapshot or the user may override the default snapshot and may provide one from another page of the resource or one that is created or supplied entirely by the user. It is noted herein that such a snapshot may be artfully created from two or more pages by mixing content for one view using a provided tool adapted for the purpose.

Interface 502 includes a text entry field 505 for imputing user-created tags for categorizing the saved resource. Field 505 does not need to be populated to practice the present invention. The system provides suggested tags for the resource, which may be entirely accepted by the user with no additional tags. In one embodiment, the suggested tags are accepted by default but the user may add additional tags to the resource. It is important to note herein that eventually tags that were accepted into the system can become obsolete over the time spanning the evolution of the page. Less relevant tags may be dropped off while more popular tags may be retained in order to make the resource more easily searchable. The more a resource is shared, the more likely those common and universally recognized tags will be used to search for the resource. The resource may be saved to a page having many other related resources so one aspect of the tagging of resources and saving those tags includes a unique visual indication for users related to which resources are more frequently tapped or accessed. More about this feature will be detailed later in this specification.

Figure 6:
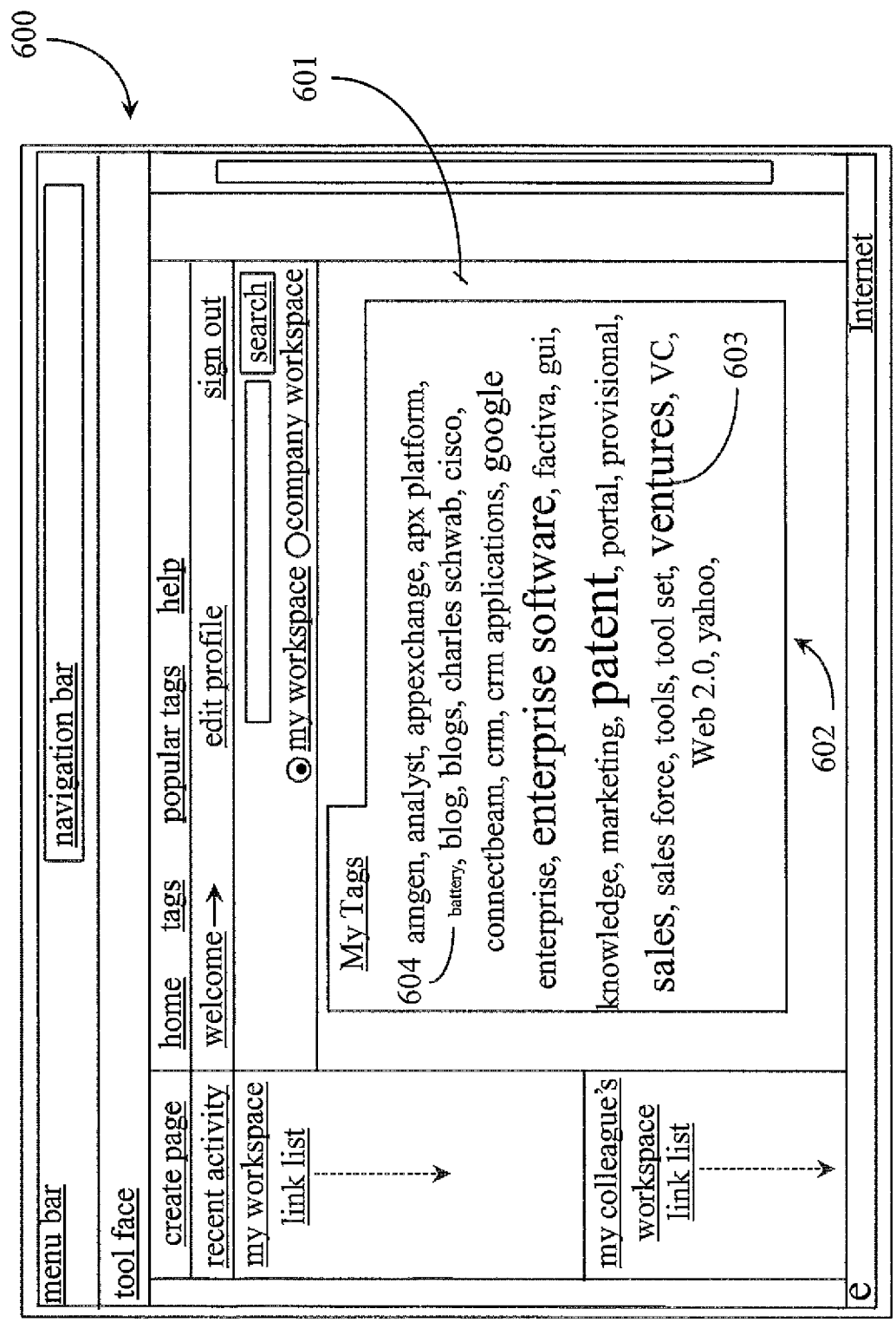
FIG. 6 is a screen shot illustrating a user tags display interface 602 according to an embodiment of the present invention.

FIG. 6 is a screen shot 600 illustrating a user tags display interface 602 according to an embodiment of the present invention. Interface 600 has a scrollable workspace window 601. Interface 602 displayed within workspace 601 includes all of the users tags "My Tags" that he or she has added to various resources he or she has bookmarked into the system of the present invention. Interface display 602 may result from interaction with the interactive OPTION "My Tags" (tags) at the top of the screen. Another option is "Popular Tags". Selecting this option may call up an interface similar to interface 602 accept that the actual displayed tags are those tags that are most popular with the enterprise subscribing group. In one embodiment, my tags, and popular tags may be simultaneously displayed in two windows for visual comparison purposes. Likewise, a user may compare "My Tags" with a colleague's tags in the same manner just described.

A unique aspect of interface 602 is that individual tags such as tag 603, for example, may be caused to change visually as the resource or resources associated with that tag is accessed. In one embodiment, more visits to a resource associated with a tag cause the tag to grow in font size accordingly. In this embodiment, the largest tags with respect to font size point to a more widely and frequently accessed resource. Least visited resources may cause the associated tags to remain the same font size or they may grow very little in size. In this way, a user may view a grouping of tags that each point to different resources and may immediately determine by visual inspection which resources are most visited, most used, and most popular with the enterprise group. In another embodiment, other prioritization schemes may be utilized as long as the visual inspection of the tags can show the evolution of the prioritized resources. The tags in interface 602 may all be hyper linked to the particular resource or set of resources that they apply to or that were created for. In one embodiment, the tags are not hyperlinks but are search tags used as keywords to return pages that share that particular tag, for example, a law firm Web site and a patent agent Web site may both share the tag patents. The category "legal" may contain those resources and many others.

Figure 7:
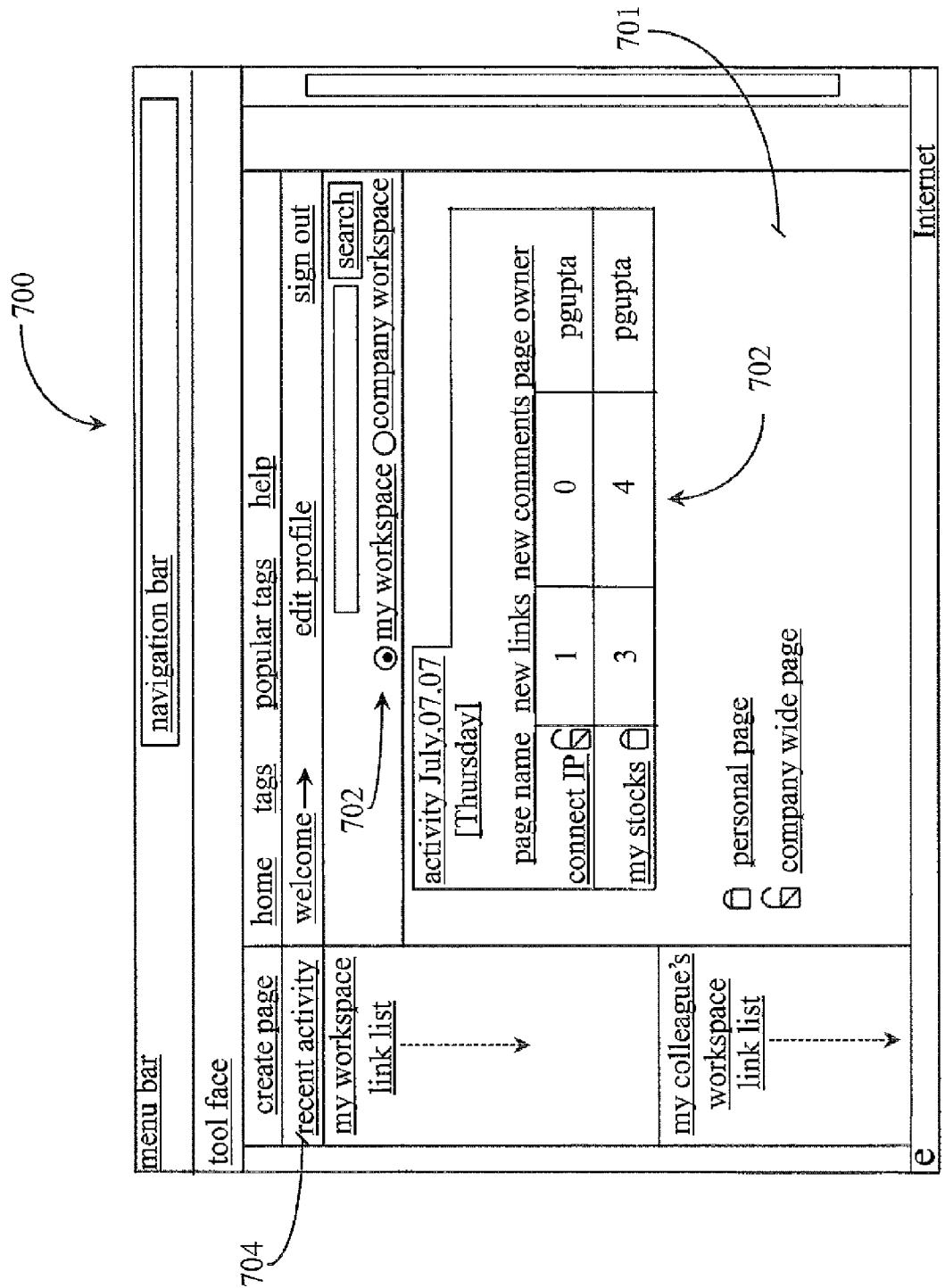
FIG. 7 is a screen shot illustrating an activity summary interface 702 according to an embodiment of the present invention.

FIG. 7 is a screen shot 700 illustrating an activity summary interface 702 according to an embodiment of the present invention. Screen shot 700 includes a scrollable workspace window 701. Interface 702 is displayed within window 701. Activity interface 702 is designed to inform a user of all of the recent activity that has occurred within the domain of that user's account. In that respect, the activity interface may be configured for display of the user activity and the activity of others that have interacted with user pages that they have been allowed to access. Similarly the activity may also reflect activity of the user visiting the pages of colleagues he or she is allowed to access. In this way, the intersections of multiple users may be documented and the related resources and tags made evident and accessible through the history interface.

Interface 702 has 3 viewing options 703 that include viewing all pages with recent activity. Another option is viewing only the user pages within the user's workspace that have had recent activity. A third viewing option is viewing only a colleague or colleague's pages that have had recent activity. In order to view colleague's recent activity, the colleague must share those pages and the user must be authorized by the colleague to view them.

Interface 702 has 4 columns. Reading from left to right, the column headings are page name, new links, new comments, and page owner. Recent activity may be any period of time the user configures into the interface. In this example, the activity report spans one work day. It is noted herein that the column headings just described, more specifically new links, new comments, and page owner may be hyperlinks having sub links provided and organized there under. For example, clicking on P. Gupta may bring up the profile of P Gupta. Sub links for may be included in the profile page that point to other resources connected to P. Gupta. Clicking New links brings up a page of new links that were added to the named resource. Sublinks on this page may point to profiles of the users adding the links, links to the tags added by the users if any, and so on.

Figure 8:
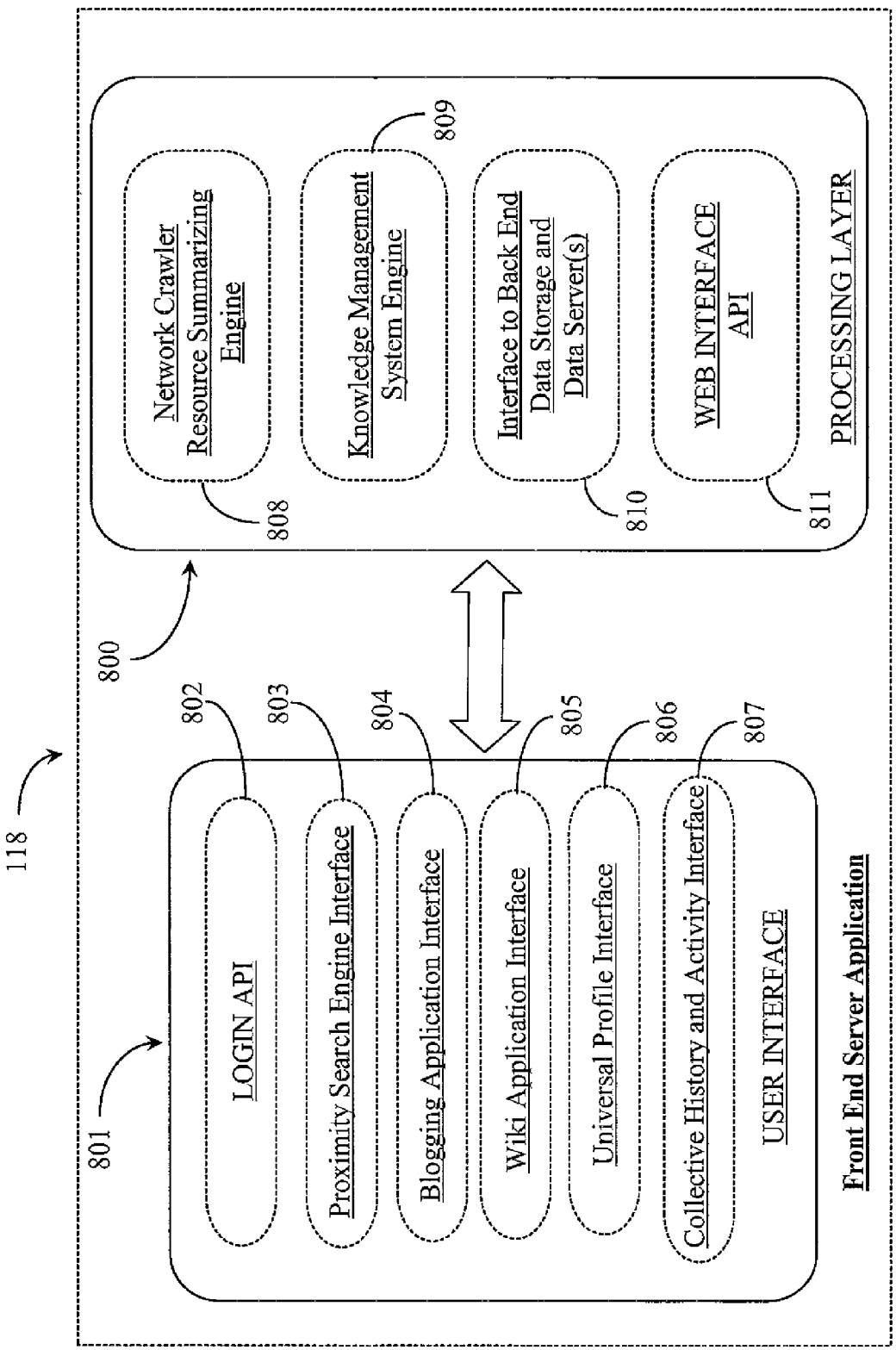
FIG. 8 is a block diagram illustrating basic human interfacing and functional components of the software of FIG. 1 according to an embodiment of the present invention.

FIG. 8 is a block diagram illustrating basic human interfacing and functional components of software 118 of FIG. 1 according to an embodiment of the present invention. SW 118 includes a front-end server application that interfaces with a back-end data server or servers. SW 118 includes a user interface (UI) 801 and a processing layer 800.

UI 801 is, in one embodiment, a browser accessible interface hosted on a network server as previously described further above. In this embodiment, enterprise personnel access the server and log in to access the user interface that is personalized to their enterprise and to them. A login application program interface (API) 802 is provided as part of the UI and may be presented in the form of a Web-based or network-based login page.

UI 803 has a proximity search engine interface 803 that enables searching of enterprise pages including personal and shared pages across the enterprise domain. A blogging application interface 804 is provided as part of the UI software and enables users to maintain and submit blogs, which may be rendered searchable and sharable resources. Like other resources, blogs may be tagged according to relevant content and/or relevancy to other resources.

UI 801 includes a Wiki application interface that may be made available to all enterprise personnel and may also be connected to the overall Wiki system maintained in the Internet network. A user profile interface 806 is provided to help establish and maintain user profiles. With respect to profiling, in addition to the usual contact information and chain of command data, user profiles are enhanced with tacit information gleaned through activity with the service of the invention. Profile information may include, but is not limited to the following:

Projects a user has worked on
Customer interactions a user has had
Documents a user has worked on
Research a user has conducted
Partners a user has collaborated with
Tags a user has created
Blogs a user has created
Comments a user has made
Documents or pages a user has commented on
Links a user has created UI 801 includes a collective history and activity interface 807 that allows a user to view activity reports and historical data regarding his own activity as well as that of other users he is authorized to collaborate with. In one embodiment, any user may obtain certain company wide statistics including activity reports for research and planning purposes.

Processing layer 800 includes a network crawler and resource-summarizing engine 808, which is able to find resources categorize them and summarize them to create a profile-based bookmark or link page as described further above. The definition of a resource shall not be limited to a Web page, but shall include single documents, document sets, drawings, photographs, memos, communication threads, and so on. The summarizing engine has the appropriate formatting converters to parse the given resource and convert the data format to a format useable for inclusion of the resource as a searchable resource over the network. Common formats might include text documents, graphic files, and sound and/or video files.

Processing layer 800 has a knowledge management system engine 809 that is responsible for discovering and mining knowledge produced through service activity on an ongoing basis. Employee contributions defined more particularly as some form of interaction where some data is produced can be included as knowledge that is compiled and may be made accessible across the enterprise. In this way, the system constantly adds new information to existing resources. Likewise, the system may also delete or purge information from the resource base when that information is no longer accessed, required, or pertinent to the enterprise. Certain priority concepts may be developed and practiced for purging data from the system such as time-based, frequency-based, or content based. The fact that contributed content is constantly applied to the knowledge base enables a timely flow of new information to enterprise personnel accessing the system to perform workflow related functions, thereby improving overall efficiency of the workflow process across the enterprise.

Processing layer 800 has an interface to back-end data storage and data server functionality. All data stored is segregated according to secure memory space allocations to subscribing entities. Each enterprise has its own secure storage space and each subscriber within the enterprise has his or her own secure storage space. In one embodiment, an enterprise domain identifies data storage for an enterprise and the enterprise assigned email address to each named employee is used to secure and identify the stored data for each of them within the enterprise. Within the design, various shared spaced can be temporarily or permanently created according to service rules.

Processing layer 800 has a Web interface API 811 that enables application access to the Internet through the service host and provides for gathering of information and resources from public domains for incorporation into enterprise knowledge bases. In this respect, it may be efficient to incorporate and tag certain resources that may exist in the public domain where those resources might be a benefit to enterprise personnel for use in collaboration, research, and so on.

Although not illustrated in this example, SW 118 may also include Web-based communication tools, for example, an instant messaging (IM) interface that is configured to show the unique presence information across the subscribing enterprise. For example, the complete universal profiles of other enterprise colleagues can be made visible through the IM interface as well as location information, online/offline status and so on. Many of the tasks that may be performed by a user operating UI 801 may also be performed operating a server hosted IM interface molded after the familiar form factor of other existing messaging interfaces. In one embodiment, a third party that offers services to multiple enterprises and their employees and colleagues hosts SW 118.

In one embodiment, SW 118 is part of a turnkey system that may be packaged and provided to single enterprises. In that embodiment, those single enterprises may host the SW and any associated hardware and may offer services to other collaborating enterprises and partners or associates that routinely do business with the enterprise. One example of such a relationship might be a single large enterprise hosting the service capabilities and making the network system available to selected material suppliers, quality control and testing facilities, shippers, subcontractors, and others whose services are critical to enterprise function. The external companies would be registered with the enterprise and the personnel of those companies would have the appropriate credentials including profiles and may contribute content, tags, and comments to the enterprise workflow that relates to their contract obligations to the enterprise. Supply chain management would be a good example of a system environment that the system of the present invention could be adapted to improve.

Figure 9:
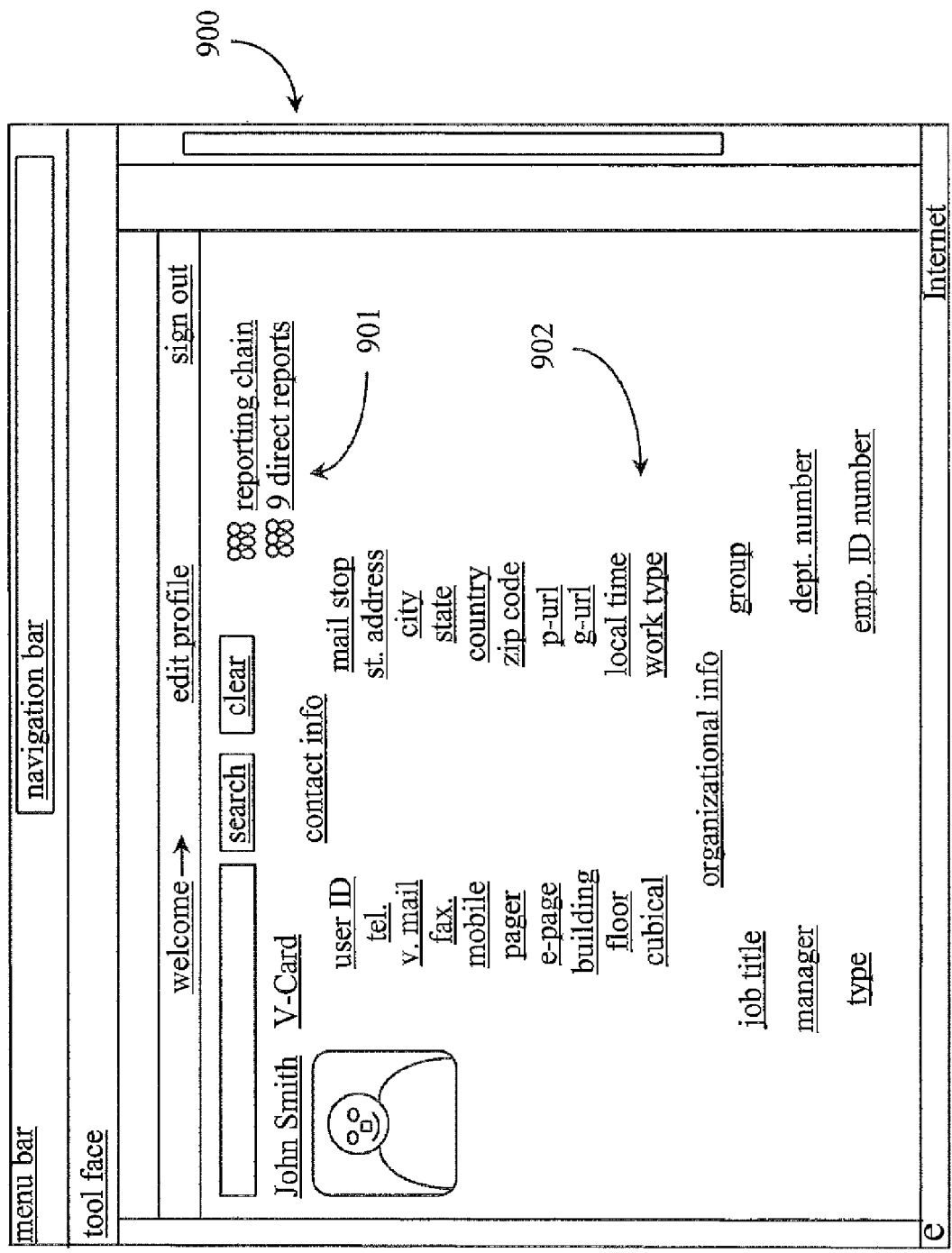
FIG. 9 is a screen shot 900 illustrating a typical employee profile.

FIG. 9 is a screen shot 900 of a typical employee profile. Screen 900 shows a typical layout of employee profile data that a user may see when clicking on the target individual from a list without the aid of the system of the present invention. Contact information 901 is typically limited to whatever the employee has configured when building his online profile for others to view. In this example there is a reporting chain or chain of command list. There is also an indication of a number or reports that the employee has submitted to that chain of command.

Other than the report indication, all of the other contact information is static information. Contact information 901 is fairly limited in scope to email information, telephone information (including mobile and pager), voicemail and fax number information and personal URL information. Location information includes building, floor and cube number. Organization data includes the employee title, group designation, and employee ID number. The employee's immediate superior, in this case, a manager is listed as well as his department number. The profile presentation exemplified as typical in this example does not incorporate any dynamic data nor does it evolve or grow with the experiences of the employee within the enterprise.

Figure 10:
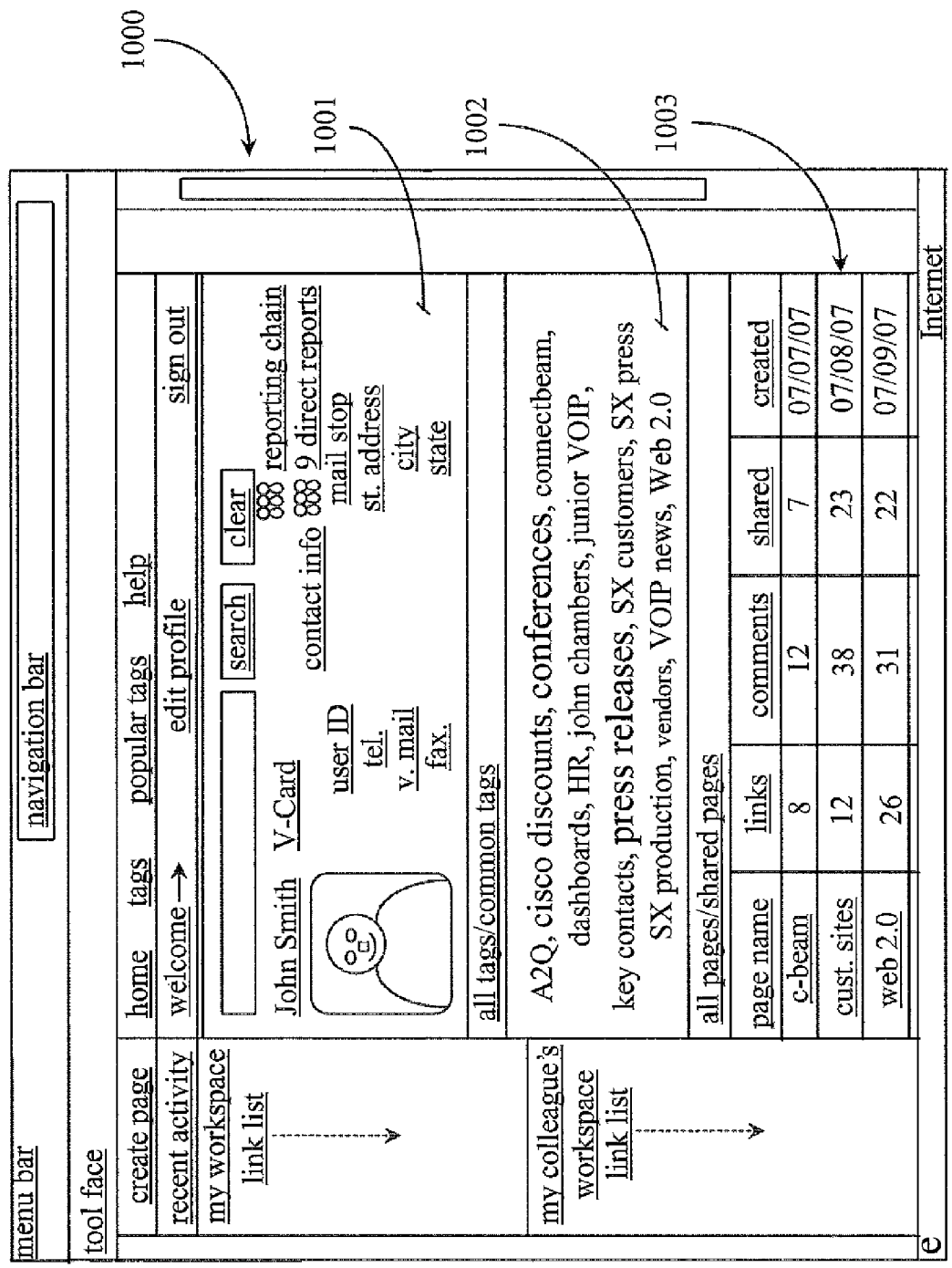
FIG. 10 is a screen shot 1000 illustrating the universal profile of the employee of FIG. 9 according to an embodiment of the present invention.

FIG. 10 is a screen shot 1000 illustrating a universal profile of the employee of FIG. 9 according to an embodiment off the present invention. As was described further above, in addition to the usual contact information and chain of command data, user profiles are dynamic in part, in a preferred embodiment, and are enhanced with tacit information gleaned through activity with the service of the invention. Profile information according to a preferred embodiment, may include, but is not limited to the following:

Projects a user has worked on
   Customer interactions a user has had
   Documents a user has worked on
   Research a user has conducted
   Partners a user has collaborated with
   Tags a user has created
   Blogs a user has created
   Comments a user has made
   Documents or pages a user has commented on
   Links a user has created The system of the invention tracks all activity by subscribing enterprise personnel and keeps record of the activity, some of which becomes part of that person's "universal" profile that may be visible to other subscribers authorized for the same enterprise domain.

Referring now to screen 1000, the usual profile data is retained in box 1001. The profile is further enhanced by attaching a list of the employee's tags representing pages he has tagged in a window 1002. An option exists with respect to the tags listed in window 1002 to view all of the user's tags or only the tags that the user has in common with the viewer. Still other options are possible for viewing the tags of the user such as viewing only the most popular user tags, and so on.

Still further, a link list 1003 is provided and displayed. The list is aggregated from the historical activity of the employee within the enterprise. The list includes the employee's main pages and the number of links for each page. Also provided are the employee's comments he has submitted during interaction with his own and other pages. There is also a column indicating the number of times the employee has shared pages with others, and a column indicating the date that the employee created (bookmarked) the main category pages.

As the employee continues to evolve with his knowledge and contributions to the enterprise, his universal profile evolves to reflect his accomplishments, professional experience, opinions, and tacit knowledge that otherwise might have been overlooked within the enterprise. The universal profiling capability provides enterprise personnel with a rich knowledge base to mine for the betterment of the enterprise. This mining activity can occur before a project is launched, for example, to ascertain the most experienced team members based on their universal profile information. Mining the employee knowledge base may also occur dynamically as collaboration ensues.

It should be noted herein that all of the knowledge information might be searchable by keyword, phrase, employee name, and so on through a search interface. In this way, entering a subject keyword and a date parameter might brink up links to knowledge contributed by any number of different employees over that period. Likewise, each link that is returned relative to a search submission may also identify the employee of origin so further search refining and navigation is possible. Further granularity may be afforded such as searching only for related comments, tags, or other particulars from the aggregate of employee universal profile information.

In another aspect of the employee profile capabilities described above with reference to FIG. 10, another feature may be provided that aggregates and presents a historically dynamic snapshot view of an employee's skills, expertise, projects and topics, and more. In a further aspect, the static profile data may be further enhanced with presence data such as where the employee is and what tasks he or she is engaging in within the system at the time of viewing. In one embodiment, an employee schedule may be accessible so that one may know what the immediate schedule of that employee is at any given time. Dynamic presence information may also be provided that indicates the phase or stage of a project or task that the employee is currently engaged in. An example might be employee is answering email at this time and is approximately 60% through the estimated task time of 30 minutes.

Figure 11:
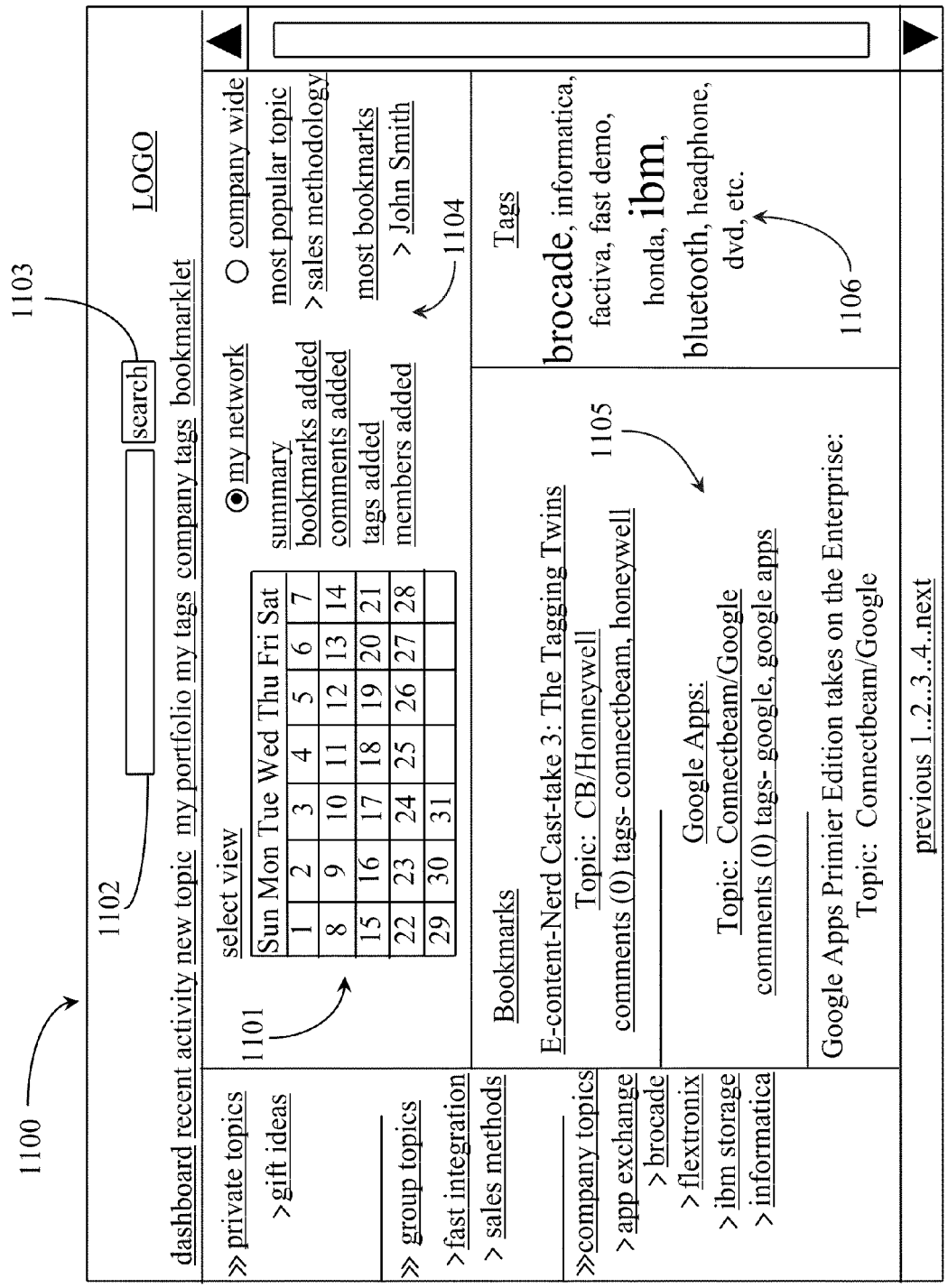
FIGS. 11 and 12 are screen shots of an interactive user interface (dashboard) in different configurations, to provide view into enterprise intelligence.
Figure 12:
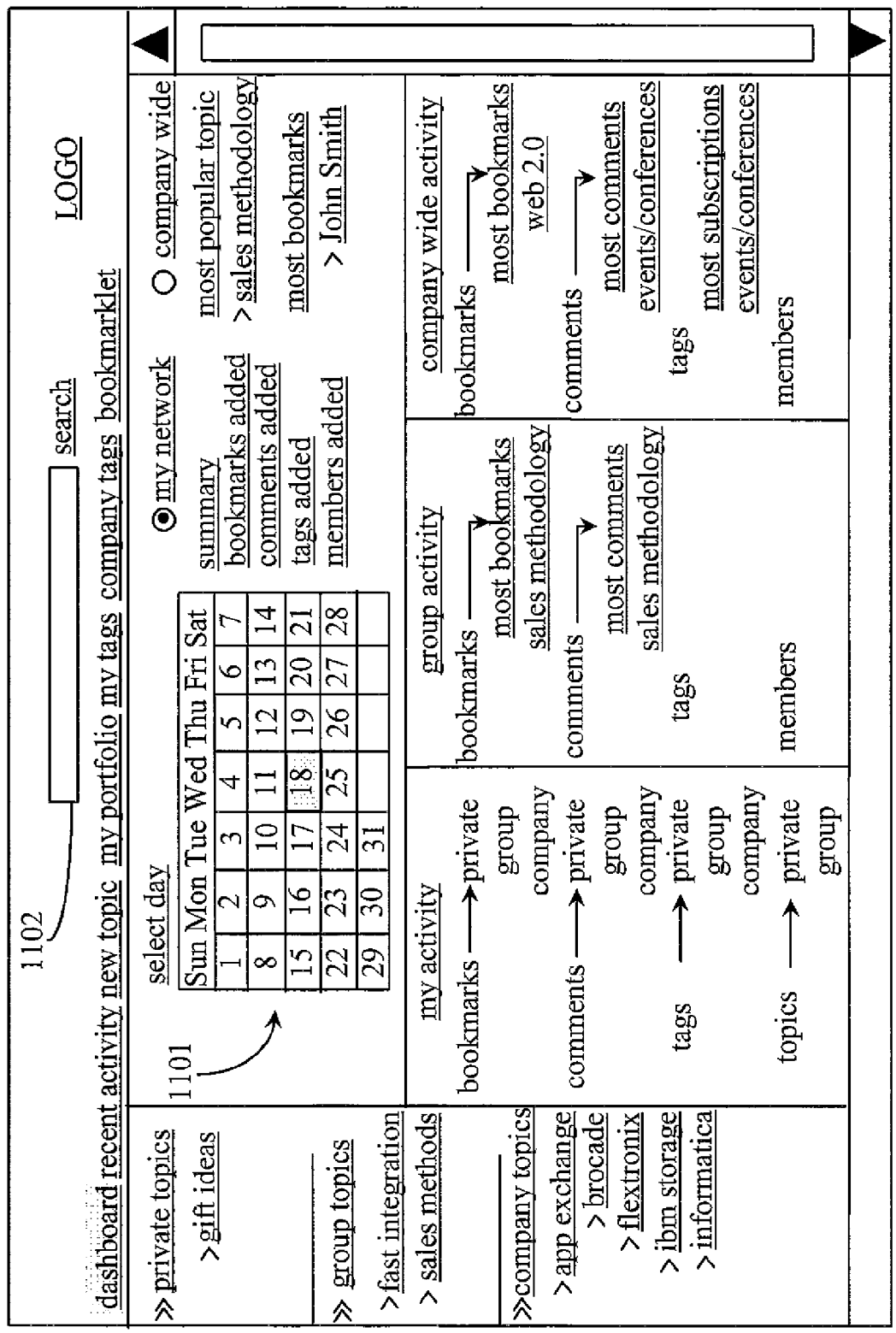

FIGS. 11 and 12 are screen shots of an interactive user interface section termed a (dashboard) view. The differing page architectures represent different configurations, providing different viewing options into enterprise intelligence.

In one embodiment of the present invention the innovative software application provides ability for knowledge workers to generate, discover, share and consume knowledge (often tacit knowledge) that is residing in the minds of their colleagues.

A series of dashboard screens (see FIGS. 11 and 12) provides users (knowledge workers and executive team) a view into the collective intelligence of their enterprise.

Referring to FIG. 11, an interactive calendar 1101 is provided within the interface. Calendar 1101 includes a plurality of calendar days, each of which are hyper links to activity history that occurred on that day. By selecting any day on the calendar, a user may revisit the activities of that day. A list of interactive headings 1104 may be presented after a calendar day is selected. Before selecting a day to view snapshot information, a user may refine the view by selecting the appropriate space he or she wishes to view history data from. In this case, "my network" is selected. In this case "my network" may represent a personal collaboration network or group maintained by the user.

Clicking on day 15, for example, in calendar view 1101 may bring up a link to a summary page of the activity for that day. A link to the bookmarks that were added that day and a link to the number of comments added that day may be provided. Likewise, a link to the number of tags added and a link to any new members added to the user's network may be provided. Further, an indication and, perhaps link to the most popular topic of the day is provided. In one variation of this embodiment, the calendar days are searchable by topic, tags, and, perhaps other criteria. For example, by inputting a topic name into a search calendar interface, the results may include just the days on the calendar on which the topic was visited during the course of work activities. In this example, the most popular topic to the group is sale methodology. Using that as a search term may cause display of all of the calendar days that month where sales methodology was discussed, presented, researched, or otherwise visited. Another displayed heading indicates who created the most bookmarks on the day selected.

In one embodiment, the calendar interface (1101) allows a user to select multiple days in sequence or at random to display the activity for all of the selected days in the same scrollable window. In one embodiment, the system provides a summary description of the activity of the day or of a period of days selected for activity display. Hence, the summary may change accordingly depending on the exact days selected.

A summary page may include such data as most bookmarks, top ten popular bookmarks, top ten most active users, and other prioritized data sets that were true for that period selected. The summary page may also include a first line to a short paragraph of description of each of the user, group, or company-wide projects that were visited for research, actual workflow contribution, and so on.

In this example, there is a search function input field 1102 provided to enable a user to conduct an internal data search or by switching mode, search calendar 1101. Only one search box 1102 may be required to perform a number of specialized searches where results are enhanced according to enterprise rules of folksonomy and other considerations. A user may enter a search term or phrase, and hit search button 1103 to initiate the search.

In one embodiment, the same engine can be set manually by the user to the following options:
  (a) search the Web
  (b) search the company wide network
  (c) search my immediate network
  (d) search my calendar.

Using option (a), a user may select normal (image, news, data, etc) search of the Web or a folksonomy-based search if the search company has enabled the feature for the enterprise. In this scenario, enterprise personnel may actually tag public resource materials held online as viable sources for enterprise use. In one embodiment, the search company may recognize the tag used as criteria when the interface is set to folksonomy mode enabling an enterprise user to receive links to one or more tagged public resources. In another embodiment, when a new resource is brought into the enterprise via a search, any tags given to that resource are automatically equated to the search term or phrase used to find the resource. In this way, if a user employs a tag to find the resource, the tag may invoke the actual term or terms used to find the resource. This may be practical in cases where the public resource like a Web site is listed in the top 10 or so on a search result page given the input search term originally used. By equating the tags to the actual best term used to locate the site, any of the various user tags created will locate the resource. In this way more flexibility is provided to different user's who may prefer to use different tags for the same resource.

The remaining search options (b)-(d) are all folksonomy based by default. Search results or "bookmarks" 1105 returned in a folksonomy-based interface are organized differently than standard search link summaries. A bookmarked link or "bookmarklet" as coined by the inventor has a page or resource title; a creator or author or owner name or domain; a topic; any comments added to the resource or page; and tags existing for the page or resource.

Search button 1103 may be activated to initiate a knowledge search inside the enterprise, leveraging employee information organized and coupled to by the software system of the invention (Connectbeam). The search function returns information about who in your enterprise has dealt with or is somehow connected to the search criteria you entered. This search function also can return activities, accomplishments, sales and nearly any other categorized information selected by the user. Through this focused access to enterprise intelligence innovation may be greatly enhanced.

Tags 1106 may be displayed adjacent to the search results 1105. In one embodiment, if a search result is highlighted, all of the tags created for that resource page may be displayed in an adjacent window, in this case to the right of the results window. The windows illustrated in this interface may all be independently scrollable. Tags 1106 may be company tags, user tags, most popular tags, least popular tags, or any other conceivable view enabled through the interface.

Referring now to FIG. 12, interface 1100 may be configured to display activity history by interacting with calendar 1101 as described further above. In this example, calendar day 18, a Wednesday, is selected as evidenced herein by a slight shading. Summary headings 1104 are displayed next to the calendar interface as previously described above. In this interface view of interface 1100, a user may order side-by-side history snapshots of his or her personal activity (window 1201), group activity (window 1202), and company wide activity (window 1203). Window 1201 reflects the user's activity relative to all of the user's authenticated areas of use, private, group, and company. Window 1202 reflects the total activity within a user's group. A user may have more than one group therefore a control or toggle may be provided to select specific user's groups. Window 1203 reflects the total activity company wide.

In another aspect of the invention a search function is provided that leverages existing search applications in a new way.

Figure 13:
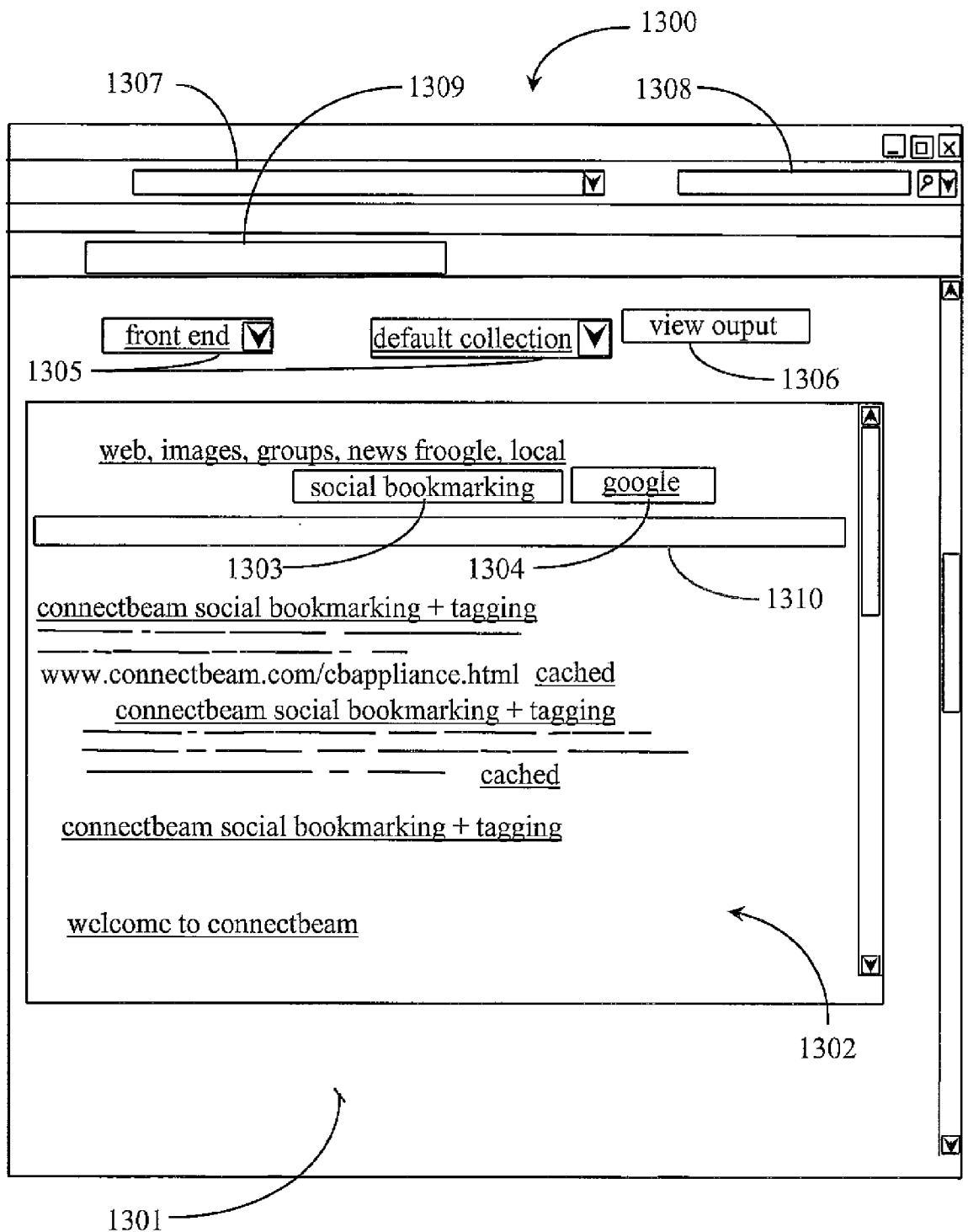
FIG. 13 is a screen shot of a Google search inside an enterprise as it may be done today, before the present invention.

FIG. 13 is a screen shot 1300 of a Google search task performed inside an enterprise as it may be done today, before enhancement by the system of the present invention. Typically an enterprise will have an enterprise search system installed. Google Mini™ and Google Enterprise Search Appliance™ (GESA) are good examples of such systems. Other companies, such as FAST Search and Technology, Autonomy, and Endeca also have systems in this area. Google's product offering is somewhat different from the rest. Google packages their software in a hardware box (appliance) and sells a turn-key hardware/software combination (GESA) that enterprises deploy behind their corporate firewalls. The GESA than crawls for content that is behind a company's firewall, on the company Intranet, for example. Other vendors are selling a purely software solution. They ship their software on CDs and it first needs to be installed on servers inside a company's data center, and then often times the software will need to be further customized before it can be put to use.

Referring now to FIG. 13, interface 1300 is a browser interface and includes a browser navigation bar 1307 adapted to accept URL addresses for navigating the network. A search index 1309 is illustrated and a typical third-party search dialog box 1308 is provided. The typical Google search page includes a text entry field 1303 for inputting search terms, in this case, "social bookmarking" and the well-known search button 1304 for submitting the search terms to initiate the search.

When adapted to search within the enterprise, a couple of other search entry fields may be provided such as text entry fields 1305 for testing the search result output for front end and default collections of data. An interactive icon 1306 enables the user to view the output format of the results and, perhaps edit the format.

Search results 1302 returned as a result of searching within the enterprise are formatted typically like generic search results. Typically speaking there is a link name followed by a partial description from the start page of the link. A link to retrieve a cached version of the start page is provided. The Web URL and the date that the URL was last updated for fresh content is typically available in the search result. Clicking on the result typically causes navigation to the resource.

Figure 14:
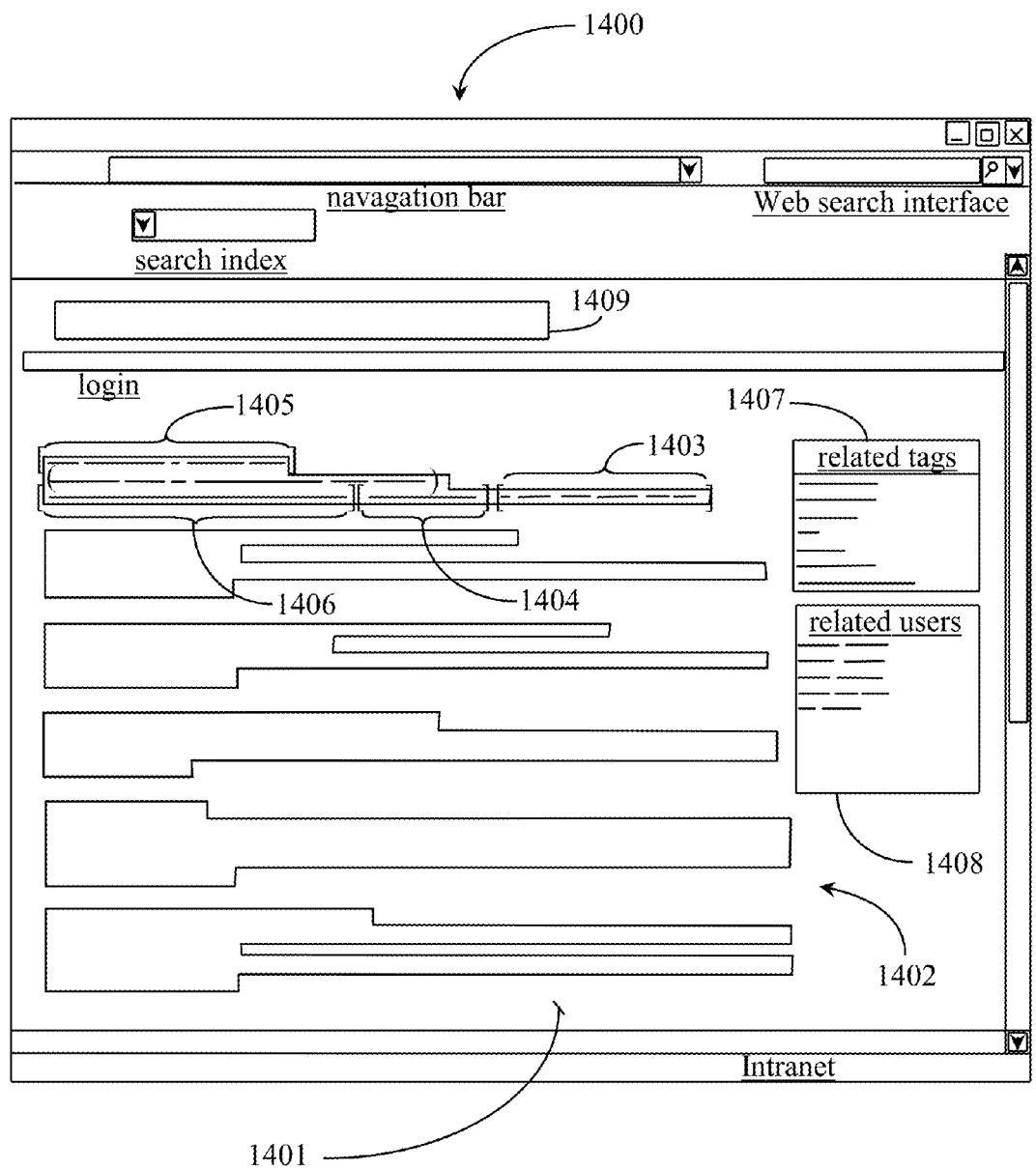
FIG. 14 is a screenshot illustrating an enterprise search in an embodiment of the present invention.

FIG. 14 is a screenshot 1400 illustrating an enterprise search performed within the enterprise according to an embodiment of the present invention. In one embodiment of the present invention the Connectbeam folksonomy-based enterprise system includes an application packaged as an in-house search engine and appliance similar in many respects to the GESA application described further above. In actual practice, the search engine adaptation provided by the inventor can be used with any software or software/hardware combination adapted to enable enterprise-centric data searching performed from within the enterprise. In a typical search engine, for each of the known search vendors (incl. Google) the search is driven by search algorithms executed on computers according to a pre-defined set of Taxonomy rules and keywords. The following are some of the problems with this current art approach:

Search results do not show which search result was useful to whom and in what context.

Typically, the number of search results returned is in thousands or even tens of thousands. This is completely anti-productive for the end user, as he/she will likely never move past the first search result page or in rare cases the second page of search results.

The user receives no information on which results are better than the others, such as what was useful to whom in my organization.

The user gets no information on whether anyone performed a similar search in the enterprise.

FIG. 14 is a screen shot 1400 of an enterprise search application managed and driven by the folksonomy-based collaboration and management system according to an embodiment of the present invention. Screen shot 1400 is a browser-based interface adapted to present a hybrid type of search engine technology that may server serve to enable more direct and more robust search results. The search adaptation may be provided as an application program interface API to any search engine package that may be used to search data within the enterprise.

Interface 1400 includes a search result page 1401 that includes a list of search results 1402. Like the typical interface, a search text-entry field 1410, a search initiation button 1411, and a results information bar 1409 are present. Generally speaking, in the system illustrated in FIG. 14 the software of the invention presents the interactive search and results window 1401. Once a search criteria is entered and the search is initiated, the software API enables provision of criteria to the Google application (or some other search application interface the enterprise might be using), and collects the results. The results are then filtered by the software of the present invention. The filtering process involves comparing the Google-returned results, and the criteria as well, with accessible company intelligence, including the dynamic information available for each employee (and perhaps others as well). The enterprise software then returns results after the filtering, which may be, for example, who in the enterprise has previously done a search with this criteria; what did they use from the result; who else is associated with these criteria; related tags; related keywords; and results are arranged by some user-defined characteristic, such as "How many times did an enterprise worker save a search result?".

In a preferred example, search results presented within results page 1401 minimally include a link title 1405 and summary description, as does a conventional search engine interface. Additional features may include a save to topics option 1404 and a summary indication 1403 of how many users may have saved the link. As usual, the URL navigation address and a last updated date may also be present. In one embodiment, a related tags window 1407 and a related users window 1408 are provided within search result page 1401. The information displayed in windows 1407 and 1408 represent dynamic content that is displayed as a result of highlighting or mousing over one of the search results, the content related to the result. Related tags are presented in window 1407 and may represent the tags already attached to the result. Window 1408 contains a list of users that have accessed the resource. These users may be responsible for creating the tags.

In this example, the adaptation to the search engine application provided by the inventor may consist of an API that intercepts the standard search results returned by the search in accordance to the submitted keyword or phrases, which may be tags and looks up the additional recorded information for each of those search results, incorporating that information into the result summary. In another embodiment, external public resources may be tagged by enterprise employees and may be added to as a resource with the actual resource remaining outside of the enterprise domain such as on a public server on the Internet. In this case, the tags are internally used to point to the external resource. When the user clicks on a result to navigate to the resource, the added portions, links, and tags, etc. are made a part of the resource.

In yet another aspect of the invention the Connectbeam software may integrate with existing software in an enterprise. Partnering with a Salesforce™ application is a good example.

Figure 15:
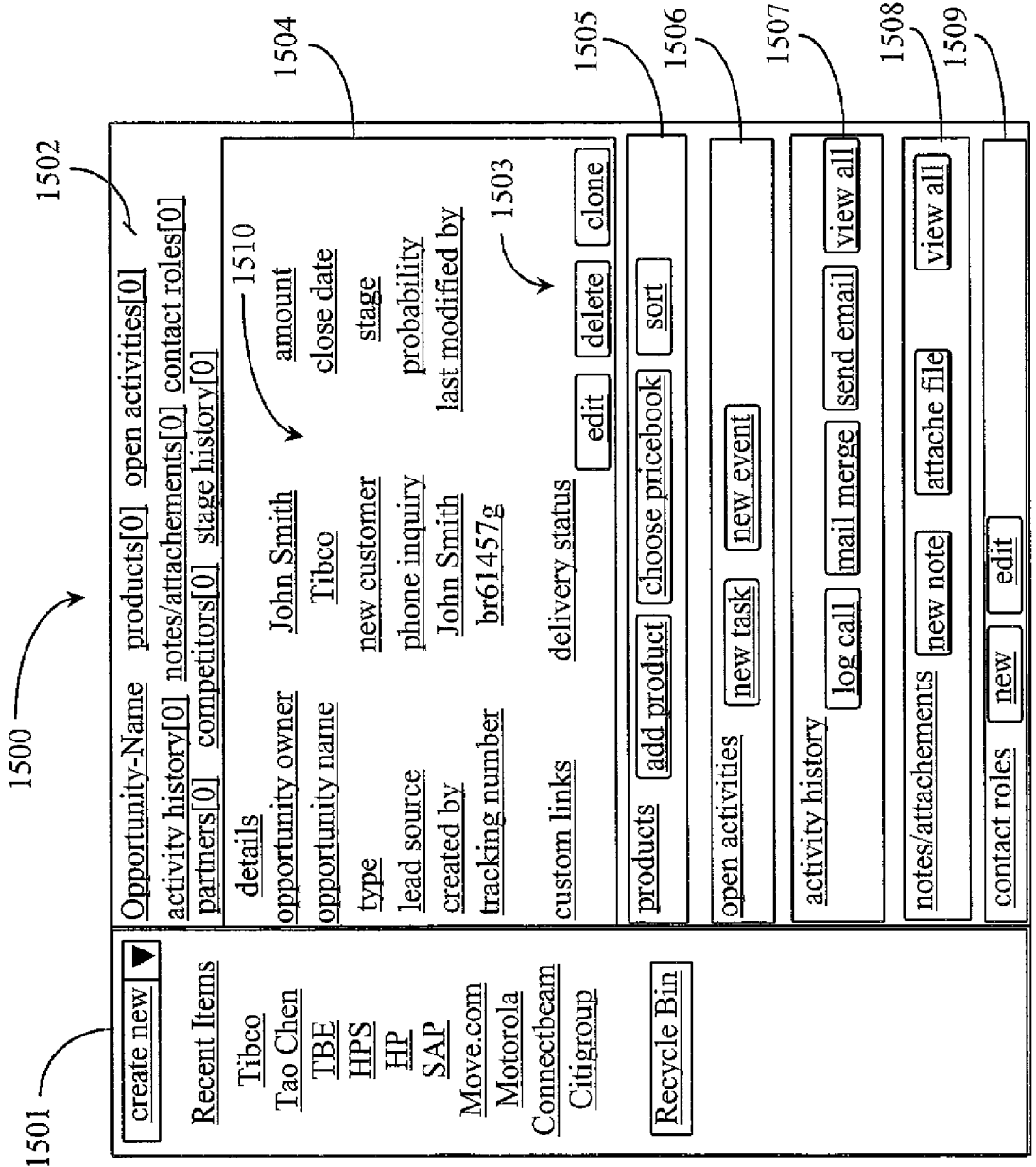
FIG. 15 illustrates an example of an interactive interface of Salesforce™, before integration with Connectbeam.

FIG. 15 is an example of an interactive sales force application (SFA) interface 1500 before enhancement by the folksonomy-based collaboration and management system of the present invention. A SFA is a software application that is provided to companies to help them with sales by providing automation to the process of sales. One company that provides such an application is Salesforce™.

In one embodiment of the present invention, the inventor provides an application program interface (API) that may be integrated with any SFA to add folksonomy-based features to the sale force automation environment within the enterprise. As previously described above, SW 118 for enterprise users (business users) enables users to collaborate and share information more effectively and easily. It provides features to help locate information inside the enterprise that is often trapped in knowledge silos scattered across the enterprise. The system uses Folkonomy to categorize and tag information as was described further above.

In this example, a conventional SFA screen shot 1500 is illustrated. Screen 1500 is, in this case, a Salesforce™. In Salesforce™ and in similar applications, a sales representative is required to manually enter all the details about an opportunity that he/she is working on. Interface 1500 is browser-based but does not include illustration of all of the generic browser features to save drawing space. In this conventional screen shot, a sales opportunity is defined and has an opportunity name in a tile/menu bar 1502. Also illustrated in bar 1502 are other interactive categories that users may interact with to view those categories.

A side bar 1501 contains a list of recently worked-on items and an interactive option, "create new", for creating a new sales opportunity. A recycle bin icon is also illustrated. Screen 1500 includes an opportunity details window 1504. A person creating the opportunity manually enters details 1510 into window 1504. An interactive options menu 1503 provides the capability of editing the opportunity details, deleting the opportunity or cloning the opportunity.

Also illustrated are category windows 1505 (products), 1506 (open activities), 1507 (activity history), 1508 (notes/attachments), and 1509 (contact roles). These category windows generally correspond to the summary headings provided in title bar 1502. The interactive category windows just described each contain sub options for performing actions. For example, products window 1505 has the sub-options add product, choose price book, and sort. Topically related sub options are included in each interactive window.

FIG. 16 illustrates a screen shot of an SFA interface integrated with the software capability of the present invention. When SW 118 is integrated with an SFA application and as a sales person using the application types in the name of an opportunity that has been added to the system, the software displays two additional pieces or sets of information related to that opportunity. The first piece of information that is accessible through the SFA interface is the tags or keywords that relate to the opportunity. Collective intelligence. These tags suggest to the users that clicking on these related tags he will come across information sources (content) that is related to the opportunity (account) he working on.

Another set of data provided through integration is related users. A display area or space 1603 shows employees inside the enterprise who are in some way related to the keyword of the sales opportunity, and other related keywords. In this case, the user data displayed in window or space 1603 include the columns name, title, contact email, and related tags. Each row is indicative of a user and the activity of that user relative to that opportunity. It will be apparent to one with skill in the art that there may be further information on related users displayed within space 1603 than is apparent in this example.

The enhanced result adds power and efficiency to the sales representative's plans and strategy. It is noted here that the example of a screen from Salesforce™ is just one example of partnering between an enterprise hosting the service of the invention and an existing third party service, in this case, a sales force service product. The service of the present invention may be integrated or adapted to many different types of enterprise applications that may exist in the art.

Figure 17:
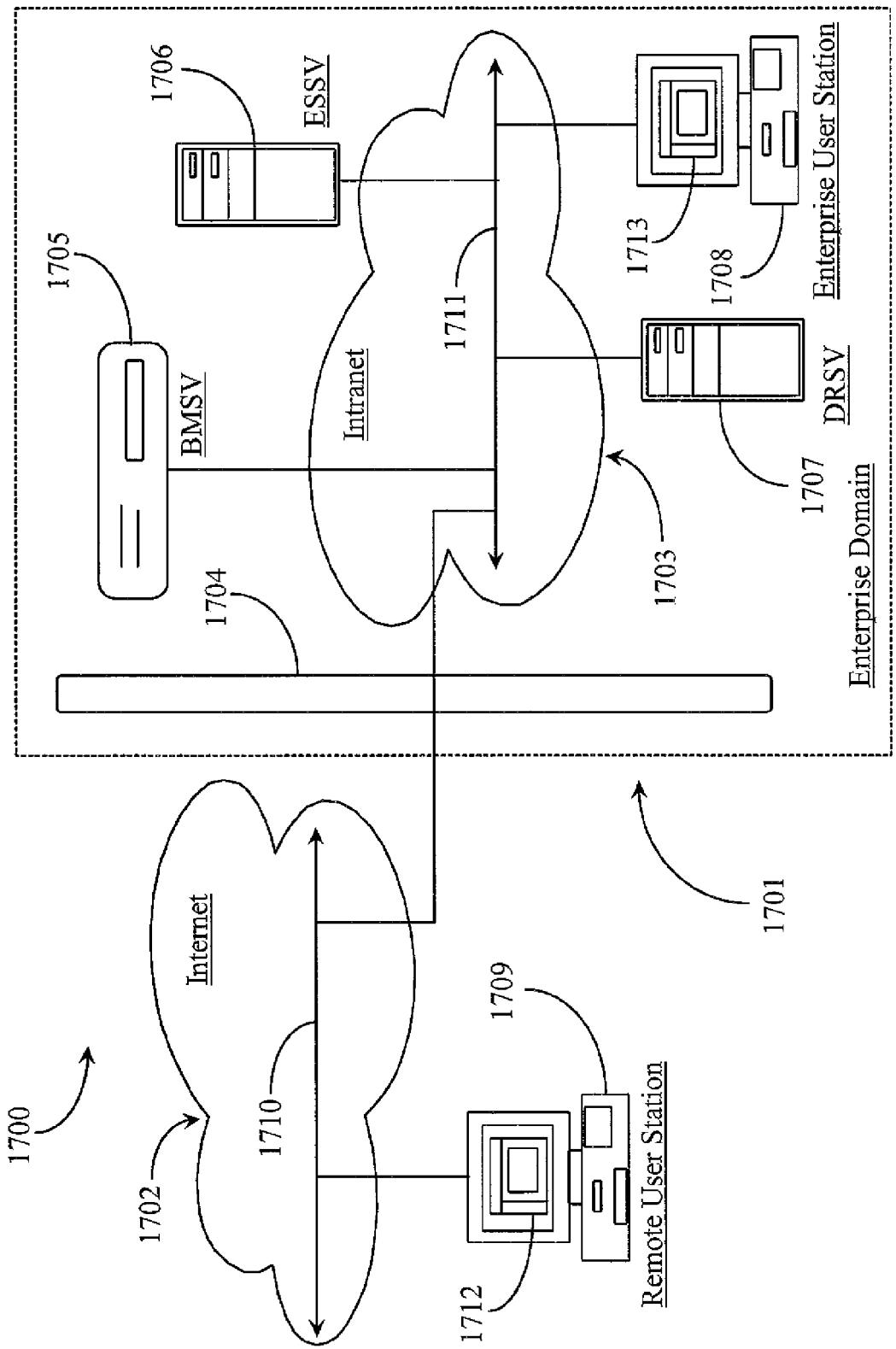
FIG. 17 is an architectural diagram showing an application appliance arrangement for Connectbeam functionality in an embodiment of the present invention.

FIG. 17 is an architectural overview 1700 of a network and enterprise domain 1701 adapted to practice the invention according to one embodiment of the invention.

In other aspects of the invention the functions of SW 118 may be provided to users in an enterprise in at least three different ways. The first, and more common, is installation of SW 118 on servers at the enterprise. In another embodiment the system of the invention may be provided as an application appliance, whereby the appliance is coupled to the enterprise LAN or WAN, inside a company firewall, and tested. In a third aspect, the service host (Connectbeam), or a licensed third party, may provide the functions of the invention at one or more Internet servers, or in another accessible network fashion, and enterprises, typically smaller businesses, may access and use the services on a subscriber and contract basis.

This embodiment illustrates the second of the three options described immediately above. This embodiment illustrates clearly that users may reside behind the enterprise firewall or in front of the firewall outside of the immediate enterprise domain without departing from the spirit and scope of the present invention. That is, remote workers are accommodated.

Architecture 1700 includes Internet 1702 with Internet backbone 1710 extending there through. Internet backbone 1710 represents the broader network outside the domain of an enterprise domain 1701. Backbone 1710 has a network connection or pipeline, which may be a virtual private network (VPN) network channel, to the enterprise domain, more specifically, to a company Intranet 1703 within the enterprise. Intranet 1703 has an Intranet backbone 1711 extending there through that represents the lines equipment and access points comprising the Intranet as a whole.

Network 1703 sits behind a company firewall 1704. VPN users like one operating remote user station 1709 may access enterprise resources using browser-based software 1712. Minimally, Intranet backbone 1711 supports a book marking appliance or server (BMSV) 1705, an enterprise search server (ESSV) 1706, and a directory server (DRSV) 1707. Directory server 1707 may be a lightweight directory access protocol (LDAP) server.

BMSV 1705 manages all of the book marking or tagging capabilities and is consulted each time any activity is performed like performing a search using ESSV 1706 or looking up an individual, group, or company sector using DRSV 1707. Appliance 1705 ensures that the updated tags and comments are served to user stations such as remote user station 1709 accessing services using browser 1712. An enterprise user station 1708 is illustrated in this example and represents any type of enterprise user accessing the Intranet using any capable computing appliance. In this case, the computing appliance is a desktop computer having network connection to Intranet 1703.

Computer 1708 is running a browser 1713. The SW of the invention, in this case, may be installed on appliance/server 1705 and is accessed from server 1705 by both the operators of computer 1708 within the enterprise and computer 1709 outside of the firewall. In one embodiment, a desktop version of SW 118 may reside on computer 1708 and computer 1709 may be provided with the functionality via download from server 1705 or from another server. In one embodiment, the SW may be provided on a server (not illustrated) within Internet 1710 and may be downloaded once registration is completed. In this embodiment, users operating appliances like computer 1708 and 1709 may collaborate using features of the present invention while the enterprise is still protected behind firewall 1704.

In yet another aspect of the present invention, related to the "third aspect" described above, it is described that the software functionality may be provided to a subscribing enterprise through a network-connected server system, such as in the Internet network, enhanced functionality may be provided to such subscribers as described with respect to FIG. 1 and in other ways.

Figure 18:
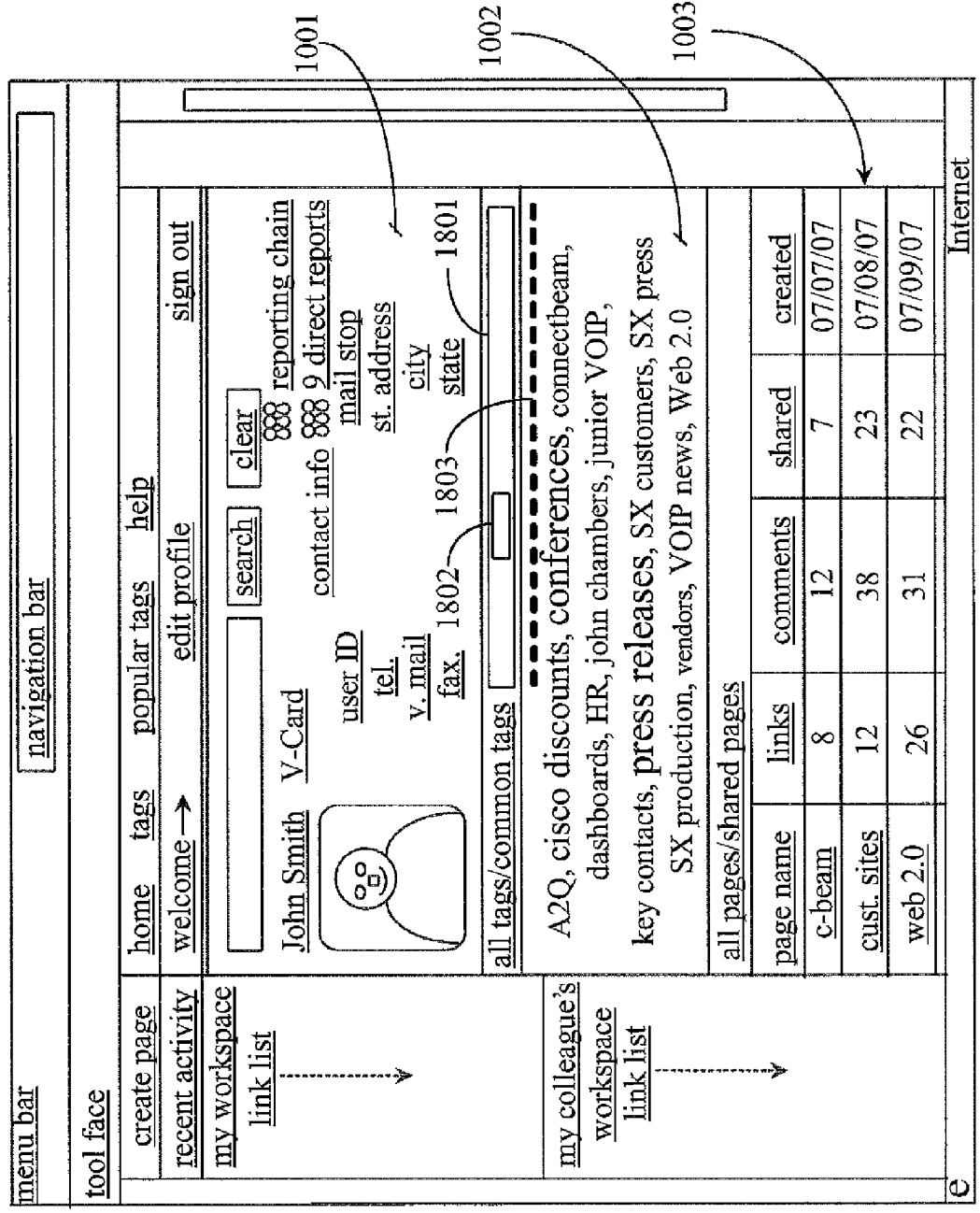
FIG. 18 illustrates screenshot 1000 of FIG. 10 enhanced with a history scrolling bar according to an embodiment of the present invention.

FIG. 18 illustrates screenshot 1000 of FIG. 10 enhanced with a history-scrolling bar according to an embodiment of the present invention. FIG. 18 is much the same as FIG. 10, with the exception of an interactive slider bar 1801 with a moveable slider 1802. By dragging the slider bar a user moves a snapshot date relative to the dynamic information display. A present-day display shows the employee's contacts, links, activities, and so forth today. Moving the slider bar shows the same employee's dynamic information on a different date in the past.

In one embodiment the software treats the slider bar as though it were spring-loaded, so if the cursor control is released, the bar snaps back to present and the display returns to present. In another feature, one may save snapshots at different times and compare and print same.

Referring now back to FIG. 1, and to all of the description up to this point. The different aspects of the present invention have been described in architecture wherein different autonomous enterprises access services through a wide-area network, such as the Internet network. Delineation between enterprises is described above in one embodiment as comprising different unique domains for different enterprises.

It is emphasized here that the provision of services through a wide area network is only one way that the services according to embodiments of the invention may be provided to different enterprises. In another aspect software for implementing the services described herein may be installed on user' premises equipment, and wholly dedicated to a specific enterprise. In such a case, all or much of the capabilities of service host domain 103 may be duplicated within the specific enterprise, and may even be tailored to requirements of that specific enterprise. In this case, that is of a dedicated system serving a single enterprise, the services and communication may be via a company local-area-network (LAN) or a combination network that may include one or more wide area networks, including the Internet network. It is well-known, for example, that many enterprises are International and global in nature, having facilities and branches in many places.

In still another aspect services may be provided by software installed and operable in an application appliance which may be installed at the enterprise' premise. More detail relating to different architectures for providing services in embodiments of the invention is provided below. The various ways services may be provided, and the architecture involved is described here to make it clear that there is no limitation to embodiments of the invention related to how nodes of intelligence operating to provide such services may be distributed, and how security between different using enterprises might be established and maintained.

The methods and apparatus of the present invention may be realized using some or all of the components described herein without departing from the spirit and scope of the present invention. Discovering tacit knowledge and then leveraging those discoveries across the enterprise provides for more efficient time management with respect to workflow activity and enables the aggregation and categorization of specific skills and talents that may be discovered among the participating employees of the enterprise. The method and apparatus of the invention may be practiced over the Internet, an Intranet, or a combination of network segments including local area networks, wireless fidelity (WiFi) networks, cellular networks and any other data packet networks that may be navigated using a browser interface running on a network-capable appliance.

In another aspect of the present invention a system provides a view into the collective intelligence of an enterprise. Presently in an enterprise, business intelligence is largely defined by having a view into the company's operations (sales, leads, supply chain, accounting, etc.). These metrics are largely the remnants of the industrial age. In a present-day global economy, the key competitive differentiator maybe how quickly and effectively a company may innovate. This in turn can only be possible by leveraging the workforce that leverages knowledge skills rather than repetitive industrial skills to push forward on the innovation frontier.

For the information worker, quick access to knowledge, collaboration, and ability to tap into the collective intelligence of the enterprise (collective knowledge of other knowledge workers inside the enterprise) is going to be key.

Figure 19:
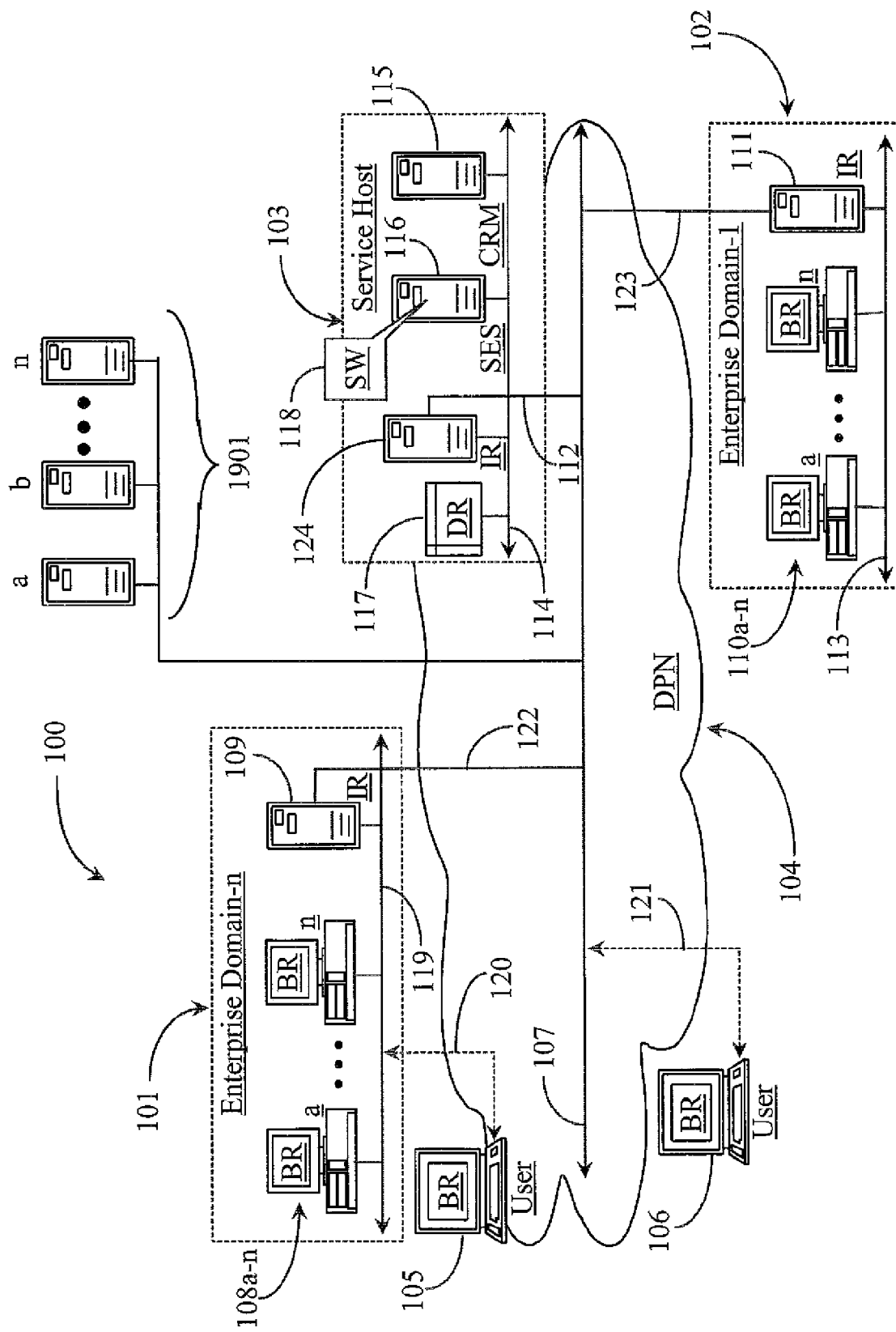
FIG. 19 is a block diagram illustrating an Internet-connected server system for providing the functionality of the invention to remote subscribers according to another embodiment of the invention.

FIG. 19 is a block diagram illustrating an Internet-connected server system for providing the functionality of the invention to remote subscribers according to another embodiment of the invention. Many of the components of architecture illustrated in this example are also illustrated in the example of FIG. 1. Such components shall retain their original element numbers and shall not be reintroduced.

Referring to FIG. 19, service host 103 is shown coupled to DPN 104, which may be the Internet network. Through network 104 host 103 may have access to many, many services, such as search services, information services of many sorts, transcription services, and the like, among many other services. In FIG. 19 such services are shown as servers 1901 a through n, connected to the network backbone. In one embodiment services to an enterprise may be provided according to all of the services described herein that are provided directly by the capabilities of the software of the invention, but need not be limited. At the time of subscription to services of the invention by an enterprise, a menu of additional services provided by third parties may be offered, and configured into a service package for the subscribing enterprise. Moreover, discounts and special terms may be offered to such subscribers, and reconfiguration of services may be accomplished at convenient times after subscription.

In the architecture of FIG. 19, third-party services configured to or for a specific enterprise may be specific to that enterprise through configuration within the domain for the specific enterprise on host 103. Such specification may be necessary, as services may vary for enterprises from one third-party supplier.

Third-party services as described just above may also be offered in the cases where the services of the invention are provided via an application appliance, in which access and subscription to such third party services are provided in the resident code of the appliance, and such services may also be provided in the instances of the software of the invention installed on an enterprise's premise equipment.

In another aspect of the invention, transparent to the architecture under which services are provided, there may be a provision for management persons of an enterprise to organize teams of employees for special purposes, such as, for example, a directed sales campaign. In this instance a series of interactive windows may be provided, accessible only by a management employee by secure identification, which allows the management employee to configure the campaign or other directed activity. In the configuration the overall nature, goals, timelines, and the like may be set. The manager may also search for qualified participants within the entire enterprise, or a subset of the enterprise, and notify and solicit participation. In some case this activity may have to seek permission from direct managers of employees solicited.

Once a team activity of this nature is configured and peopled, there may be facility for conferencing, for entering accomplishments against goals, for prioritizing, and the like, in the carrying-out of the goals of the activity. Reports, summarizations and the like may also be saved for historical record, for mining by other managers. A facility may also be provided for managers to review existing campaigns and directed activities as fodder for producing new directed activities.

In another aspect of the invention internal and external self-help activities may be provided, either wholly within an enterprise, or over several enterprises. Employees in this aspect may peruse, anonymously, if desired, a menu of self-help services offered. These may be in the nature of habit modification, as may apply to drinking and drugs, education in specific areas, for example music, languages, mathematics, remedial reading, and many other areas, courses in sales, public speaking, confidence building, philosophy and much more. There may be facility within the host for recording employee accomplishments in these areas. Such services are in a spirit of going beyond knowledge access and sharing, into areas of employees being able to share goals, dreams, and more.

In yet another aspect facility may be provided for certain management employees to sponsor and direct certain programs for employee development. This aspect differs from the self-help aspects in self-help it is entirely up to the employee. In the management-directed aspect facility may be provided for Human Resources, for example, to classify employees, through accessing records or even through testing, in various areas of development of interest to the company. Public speaking may be one simple example. Human Resources may be provided with resources to determine which employees are good public speakers, and may then encourage those who are not to avail themselves of programs to develop public-speaking skills. Sales techniques are another good example. Network-bases testing may identify those who are good salespeople and those who are not; and those who are not (but perhaps should be, by the nature of their responsibilities), and encourage or even insist that certain employees receive specific training and practice.

In still another aspect of the invention, beyond the self-help aspects, company-sponsored development programs, and the like, organization may be provided for employees to group in such as clubs for human interest purposes, such as poetry, opera, guitar playing, dating services, and much more, all within the auspices of the particular enterprise.

Services according to various aspects of the present invention have been described relative to enterprises that may be thought of typically as commercial enterprises, such as private businesses. This is not, however, in any way a limitation in aspects of the invention. Services may be configured for enterprises of all sorts, including but not limited to private businesses, universities, private and public schools of all sorts, political organizations, government departments, and generally for any sort of structured human endeavor. In some cases services may be configured and provided for enterprises within an enterprise. For example, a private business may have multiple sites that have different needs, such as in language, culture, marketing area, product or service offerings, and more. Specific configuration can be done to be specific and most helpful for each such enterprise within an overall enterprise.

In yet another aspect of the present invention a range of services is provided, particularly applicable to enterprises dealing with certain products and services, such as high-tech start-up companies, to aid those companies in developing and protecting intellectual property. The ins and outs of patent law are quite well-known to many practitioners in the field, but much less well-known to most inventors and managers who are not trained and experienced in preparing and prosecuting patent applications.

In this aspect of the invention directive and instructional material is provided through the SW connectivity to direct employees how to aid the enterprise in establishing intellectual property. Such material might include the basics of patent law, the importance of early disclosure and establishing a priority date, how to make a disclosure, and so forth. The system might also enable managers to organize invention projects, in the nature of company-directed projects as discussed above. There might be problem propositions and then brainstorming conferences directed toward solutions to the problems. Incentive programs can be established. All of the various aspects of an intellectual property program as might be envisioned by an in-house patent counsel may be included.

In still another aspect of the invention searches on an enterprise Intranet, as described in many places above, may be integrated with Internet search. This innovation integrates in single workflow, single user interface, and a single click—both the collective intelligence of the World Wide Web and that of a user's place of business, company or enterprise.

FIG. 20 illustrates an interactive window of the sort a browsing person sees when accessing Google™, for example. As described above, the present invention in several embodiments provides a social bookmarking and social networking application to enterprises, such as both large and small business entities. The invention provides an application that helps enterprises empower their users to build and tap into the collective intelligence of its enterprise. It helps them discover who knows what inside their enterprise in the context of information an employee maybe searching for.

Returning to FIG. 20, a user at Honeywell, while operating on a company network, may type www.google.com, accessing the Google™ web site and may then conduct a keyword search on Aviation lighting. Not only does the user get search results back from what Google's Internet Search engine returns and ranks, but also embedded within the search results are items from the application of the invention, running on the enterprise network. These items are items that other users inside the enterprise have bookmarked and tagged related to the same search keyword—Aviation lighting.

This way, the user, via one click and a single interface, gets search results from the Internet and the Intranet used by the specific enterprise.

Such a collective search facility and function is provided in an aspect of the present invention, which affords members of an enterprise ability to search data collections within the enterprise, even if the enterprise is a federated system with geographically separated and remote enterprise sites, and at the same time, with the same criteria and the same initiative impulse, to search Internet sites and other more public data repositories; and to keep returns organized and associative as to origin of information.

Figure 21:
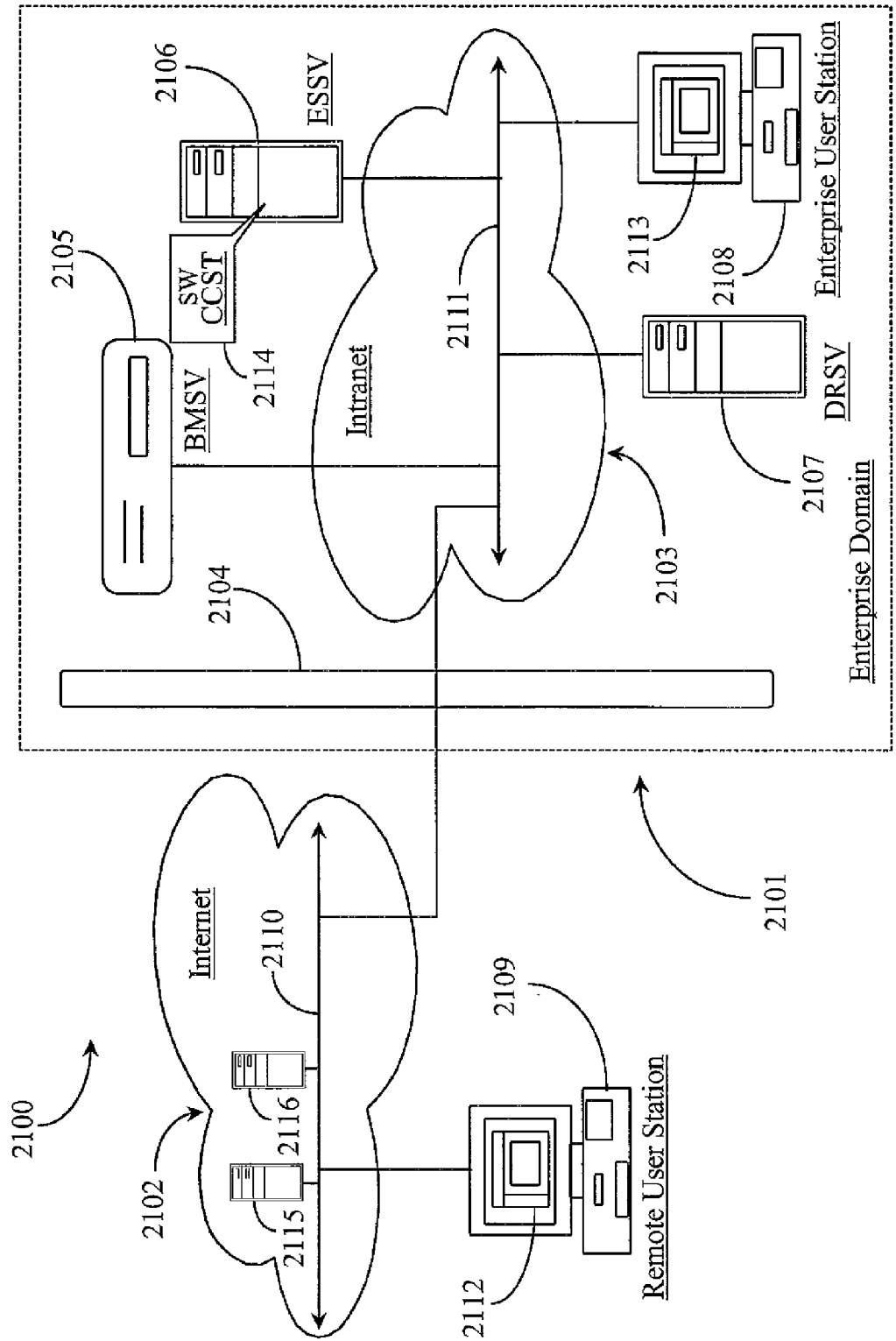
FIG. 21 is an architectural overview of a network and an enterprise domain adapted to practice collective search in one embodiment of the invention.

FIG. 21 is an architectural overview 2100 of a network and enterprise domain 2101 adapted to practice the invention according to one embodiment of the invention. In the architecture illustrated as FIG. 21 an enterprise 2101 is illustrated as existing behind a firewall 2104, but connected through the firewall to the well-known Internet network 2102 having a backbone 2110 representing all of the myriad of connections and interconnections within the Internet. Two servers 2116 and 2115 in the Internet 2102 represent Internet web sites, of which there are many, many more, as is well-known in the art. A remote user station 2109 with a display 2112 represents stations connected to the Internet by any one or more of many well-known ways, providing access, under special security circumstances (a virtual private network (VPN)) for example, to remote workers associated with or members of enterprise 2101.

Enterprise 2101 has an intranet network 2103 behind firewall 2104. VPN users such as one operating remote user station 2109 may access enterprise resources using browser-based software operable on their remote computers or other digital appliances.

In a system known to the inventor enterprise software, based at least in part on social-networking structure and functionality, or 'folksonomy technology', is installed and operable in the enterprise, providing services and functionality for workers to access intelligence, data, history, and associations of other workers in the enterprise. Minimally in this enterprise intelligence system, Intranet backbone 2111 supports a bookmarking appliance or server (BMSV) 2105, an enterprise search server (ESSV) 2106, and a directory server (DRSV) 2107. Directory server 2107 may be a lightweight directory access protocol (LDAP) server.

BMSV 2105 manages bookmarking and tagging capabilities connecting the characteristics of workers associated with the enterprise, each of which have an enterprise-stored profile with which the system works. The BMSV may be consulted each time any activity is performed, like performing a search using ESSV 106 or looking up an individual, group, or company sector using DRSV 2107. BMSV 2105 ensures that updated tags and comments are served to user stations such as remote user station 2109 accessing services using a browser having an interactive screen displayed on monitor 2112. An enterprise user station 2108 is illustrated in this example and represents any sort of enterprise user accessing the Intranet using any capable computing appliance. In this case, the computing appliance may be a desktop computer having network connection to Intranet 2103.

Appliances 2108 and 2109 are in one embodiment enhanced with software that cooperates with the system in the enterprise providing the sharing of intelligence. In some cases versions of the enterprise intelligence system known may be installed on existing enterprise equipment, and in some cases the functionality may be made operational in an enterprise by installing a dedicated server in the enterprise and connecting that new dedicated server, having the intelligence software and functionality, to Intranet 2111. In still other cases the system, or portions of the system, may be downloaded from Internet sites like sites 2115 or 2116. In still other instances portions of the system may be operated remotely from inside the enterprise with the functionality executing on an Internet connected server like server 2115 or 2116.

The intelligence system described above supports an instance of the present invention, which is enabled in part by software 2114 executing in this embodiment on ESSV 2106. This functionality is termed by the inventor a Connectbeam Collective Search Toolbar (CCST) and system. The CCST serves up information from inside a user's organization (business, enterprise, or company) related to keywords or phrases, i.e. search criteria, which the user enters to search for information. The user will have an interactive interface on his appliance either inside the enterprise, or outside the enterprise as a remote worker through such as a VPN, and a facility for entering search criteria as is known in the art. In one embodiment this interface is a Google window. In an embodiment of the present invention when the user enters a search criteria, and initiates the search (such as by the Enter key on a keyboard, or an interactive button or link) the system, with the single keystroke or click, launches searches, based on the same criteria, through a variety (two or more) of search paths.

In a rather simple embodiment the search is launched in the enterprise, searching all available data stores, and simultaneously through, for example, Google on the Internet, outside the enterprise, looking into the information collected by that entity from accumulated web crawling. In somewhat more robust embodiments searches may simultaneously be launched inside the enterprise, and through more than one search function outside, such as Google™ and Yahoo™. In a more sophisticated embodiment searches may also go to sites like CNN.com and Wikepedia.org.

In embodiments of the invention CCST is the first toolbar and application workflow and framework that on a single click and on the same UI interface combines and delivers the collective intelligence from within a users enterprise with that of what the user is searching for outside the company Intranet, and CCST does so in a completely secure manner.

CCST in at least one embodiment is pre-programmed to look for major search engines, for example including at least Google™, Yahoo™, MSN™, Live™, and Ask™. In this embodiment, when a user, while on the enterprise network 2111, goes to any one of these search websites and enters a criteria for search, CCST is able to capture the criteria and use to use it to look for information inside the user's enterprise as well, and at the same time, and in some embodiments the information returned is sorted and identified as to source inside or outside. In near real time the system compiles the information including for internal information related tags, and people/expertise and related users, and displays all of that to the user as part of the same user interface.

Figure 22:
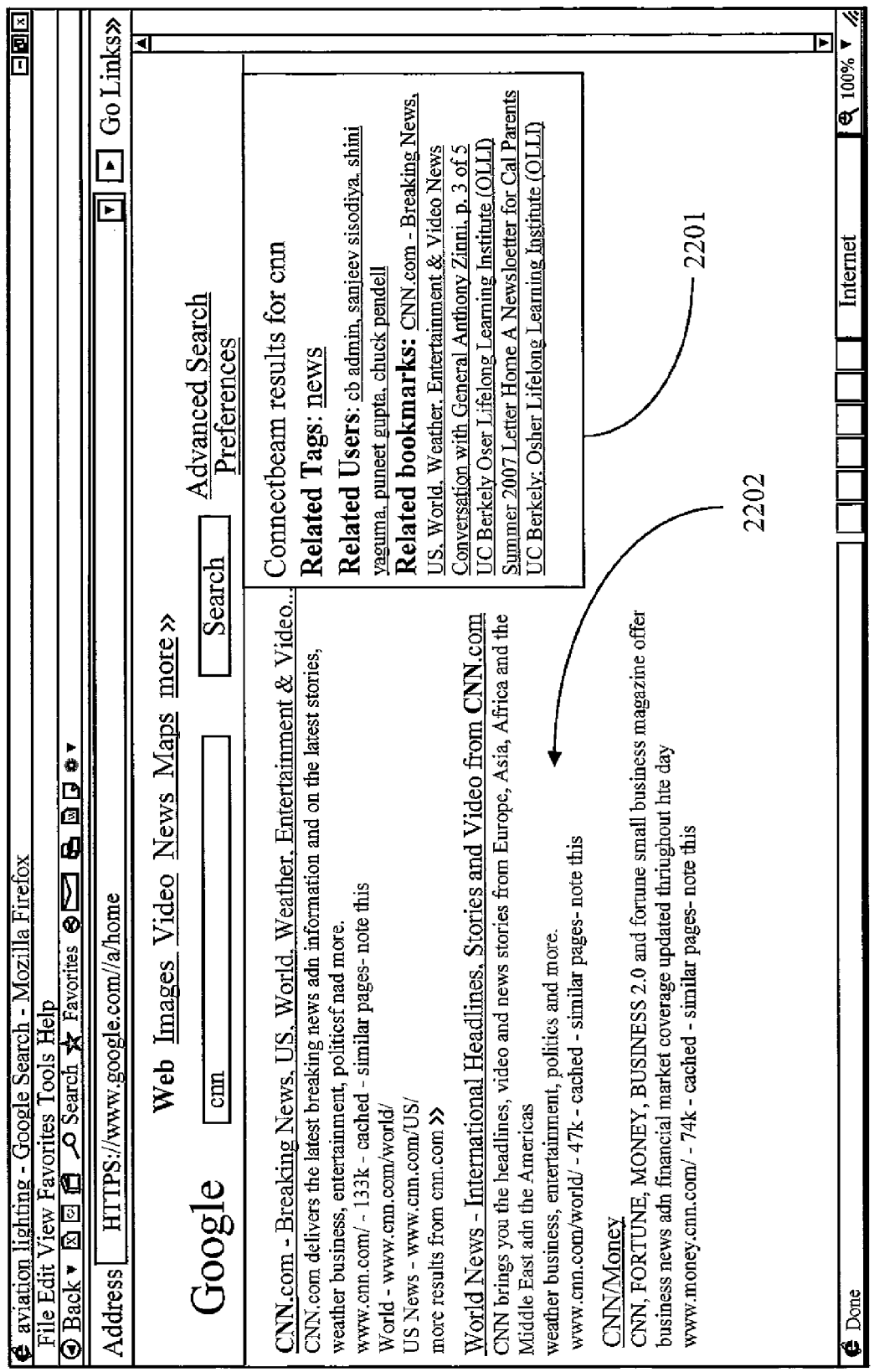
FIG. 22 is an illustration of a user interface in an embodiment of the present invention illustrating an information return accomplished by an integrated collective search.

FIG. 22 is an illustration of a user interface in an embodiment of the present invention illustrating an information return accomplished by an integrated search according to an embodiment of the present invention. Internet results are listed as list 2202, and an additional return 2201 illustrates intelligence returned from the user's enterprise, showing four workers associated in one way of another with the search criteria, and bookmarked internal sources as hyperlinks that, when clicked, may show further information.

In some further embodiments CCST may be customized to target additional sites (websites—not just search engine websites, but any website of user's choosing that the user frequents for searching for information) as part of this search experience. For example, if the user visits CNN, CNET, IEEE.org, or for that matter any other site, and as long as these sites have a search box, the user can configure the CCST to also show and blend the search results from inside the users company when he/she does the search on the websites.

The way this works is that the user configures CCST with the search string part of the URL that the site translates to when the user does a search on this website. For example, when the user searches on Google, the search format of the URL may be as follows:
http://www.google.com/search?hl=en&q=connectbeam
Connectbeam has preprogrammed http://www.google.com/search? Part in its CCST. Similarly, for example on CNN (www.cnn.com) when a search is performed the URL looks like this:
http://search.cnn.com/search.jsp?query=connectbeam&type=web&sortBy=date&intl=false Connectbeam will allow the user to input (configure into Connectbeam) the following part of this URL: http://search.cnn.com/search.jsp? thereby, delivering the same collective search experience as shown in FIG. 22—to any site the user goes to and does a search.

In various embodiments of the present invention it is possible now to meet a user at their point of search, wherever they choose to search, and to present to that user the total and collective intelligence in that user's digital universe. This includes, but is not necessarily limited to the following:
1. What the user has bookmarked and collected
2. What the user's social network has collected and contributed
3. What has been found on the company Intranet
4. What has been found on the public Internet
5. What may be found in specific data collections accessible to the user through various networks other than the sites described above It will be apparent to the skilled artisan that the invention has been described using specific examples. These examples, however, shall not limit the invention, which may be implemented in many and sundry other ways beyond the specific examples described. The invention is limited, therefore, only by the scope of the claims.

What is claimed is:

1. A search system comprising:
a computerized appliance coupled to a private enterprise network, the appliance executing software from a non-transitory machine-readable medium;
a data repository coupled to the private enterprise network, the data repository storing dynamic personal profiles associated with individual users in the enterprise, individual ones of the dynamic personal profiles comprising content including at least contact information for the associated user, position and responsibility within the enterprise for the associated user, a listing or description of skills and expertise for the associated user, and a history of enterprise-related activity of the associated user tracked and recorded as activity occurs, the activity tracked and recorded comprising projects the user has worked on, customer interactions the user has conducted, documents the user has worked on, research the user has conducted, partners with which the user has collaborated, tags the user has created, blogs the user has created, comments the user has made, documents or pages the user has acquired or commented on, and links the user has created, all content associated with the individual user; and
a network interface to the Internet network;
wherein the software executing causes the computerized appliance to:
present an interactive search interface to a first user, enabling the first user to select to initiate a conventional search returning a page or pages associated with an entered search criteria and identifying a source of the page or pages returned, the search accessing both the Internet network and the internal network, including the dynamic personal profiles of the individual users in the enterprise, or a folksonomy-based search, returning information about who in the enterprise has dealt with in the past or is connected by content in the associated dynamic personal profile to the search criteria entered;
wherein the interactive search interface also presents a calendar interface enabling the first user to select a time window, the selection limiting the folksonomy-based search to activity stored as content in dynamic personal profiles within the limits of the time window, and an interactive list of category links comprising at least tags, bookmarks, comments and members, enabling the first user to limit the search to one or more selections from the list of category links in addition to the limit to the time window.

2. The system of claim 1 wherein the computerized appliance is located outside the enterprise and coupled through a firewall to the one or more private enterprise networks.

3. The system of claim 1 wherein the software is based upon or uses a commercially available search application.

* * * * *